(12) United States Patent
Elboim et al.

(10) Patent No.: US 10,244,585 B2
(45) Date of Patent: Mar. 26, 2019

(54) APPARATUS AND METHOD FOR SENSING AND PROCESSING BY RF

(71) Applicants: GOJI LIMITED, Hamilton (BM); Ram Elboim, Modiin (IL); Itzhak Chaimov, Mazkeret-Batya (IL); Ronen Cohen, Pardesiya (IL); Ben Zickel, Qiryat Bialik (IL); Maksim Berezin, Netanya (IL); Coby Maron, Tel Aviv (IL); Amir Burnstein, Tel Aviv (IL)

(72) Inventors: Ram Elboim, Modiin (IL); Itzhak Chaimov, Mazkeret-Batya (IL); Ronen Cohen, Pardesiya (IL); Ben Zickel, Qiryat Bialik (IL); Maksim Berezin, Netanya (IL); Coby Maron, Tel Aviv (IL); Amir Burnstein, Tel Aviv (IL)

(73) Assignee: GOJI LIMITED, Hamilton (BM)

( * ) Notice: Subject to any disclaimer, the term of this patent is extended or adjusted under 35 U.S.C. 154(b) by 393 days.

(21) Appl. No.: 15/027,343

(22) PCT Filed: Oct. 6, 2014

(86) PCT No.: PCT/EP2014/071368
§ 371 (c)(1),
(2) Date: Apr. 5, 2016

(87) PCT Pub. No.: WO2015/052145
PCT Pub. Date: Apr. 16, 2015

(65) Prior Publication Data
US 2016/0249416 A1 Aug. 25, 2016

Related U.S. Application Data

(60) Provisional application No. 61/887,684, filed on Oct. 7, 2013.

(51) Int. Cl.
*H05B 6/64* (2006.01)
*H05B 6/68* (2006.01)
(Continued)

(52) U.S. Cl.
CPC .......... *H05B 6/6447* (2013.01); *H05B 6/645* (2013.01); *H05B 6/6438* (2013.01); *H05B 6/68* (2013.01);
(Continued)

(58) Field of Classification Search
CPC .......... H05B 6/72; H05B 6/67; H05B 6/6438; H05B 6/686; H05B 6/705; H05B 6/6447; H05B 6/645
(Continued)

(56) References Cited

U.S. PATENT DOCUMENTS 5,321,232 A * 6/1994 Ogle ................. F24C 7/087
219/494
5,426,280 A * 6/1995 Smith ................. H05B 6/6441
219/506

(Continued)

OTHER PUBLICATIONS

International Search Report in PCT/EP2014/071368, dated Dec. 23, 2014.

*Primary Examiner* — Thien S Tran
(74) *Attorney, Agent, or Firm* — Greenblum & Bernstein, P.L.C.

(57) ABSTRACT

A disclosed apparatus for sensing and processing an object in a cavity (104) comprises a sensing RF source (110) and a sensing antenna (112), and a processing RF source (120) and a processing antenna (122). The sensing RF source is configured to generate low power RF radiation at a first frequency range and the sensing antenna is configured to feed the cavity with RF radiation generated by the low power RF source. The processing RF source is configured to generate high power RF radiation at a second frequency
(Continued)

range, and the processing antenna is configured to feed the cavity with RF radiation generated by the processing RF source. A protecting system (130) configured to protect the sensing RF source from RF radiation generated by the processing RF source may be provided.

24 Claims, 8 Drawing Sheets

(51) Int. Cl.
*H05B 6/70* (2006.01)
*H05B 6/72* (2006.01)
*H05B 6/76* (2006.01)

(52) U.S. Cl.
CPC ............. *H05B 6/686* (2013.01); *H05B 6/705* (2013.01); *H05B 6/72* (2013.01); *H05B 6/76* (2013.01); *H05B 2206/044* (2013.01); *Y02B 40/143* (2013.01); *Y02B 40/146* (2013.01)

(58) Field of Classification Search
USPC ........ 219/506, 690, 697, 714, 729, 750, 756
See application file for complete search history.

(56) References Cited

U.S. PATENT DOCUMENTS

| | | | |
|---|---|---|---|
| 6,884,979 B1 | 4/2005 | Toerngren et al. | |
| 7,723,655 B2* | 5/2010 | Kim ..................... | H05B 6/6441 |
| | | | 219/714 |
| 2010/0082084 A1 | 4/2010 | Brannan et al. | |
| 2013/0080098 A1 | 3/2013 | Hadad et al. | |
| 2013/0206749 A1* | 8/2013 | Libman ................. | H05B 6/686 |
| | | | 219/553 |
| 2014/0063676 A1* | 3/2014 | Sigalov ................. | H05B 6/645 |
| | | | 361/143 |
| 2014/0247060 A1 | 9/2014 | Ben Haim et al. | |
| 2015/0034632 A1 | 2/2015 | Brill et al. | |
| 2015/0070029 A1 | 3/2015 | Libman et al. | |
| 2015/0366006 A1 | 12/2015 | Ben-Shmuel et al. | |
| 2016/0161425 A1 | 6/2016 | Berezin et al. | |

\* cited by examiner

| FREQUENCY | TIME | AMPLITUDE 122a | AMPLITUDE 122b | AMPLITUDE 122c | PHASE a-b | PHASE a-c |
|---|---|---|---|---|---|---|
| 905 | 10 | 1 | 1 | 0 | 180 | - |
| 912 | 7 | 1/2 | 1/2 | 1/2 | 120 | 150 |

APPARATUS AND METHOD FOR SENSING AND PROCESSING BY RF

FIELD AND BACKGROUND

The present disclosure concerns methods and apparatuses for processing objects by RF energy. The processing may include, for example, cooking, heating, drying, and/or thawing.

Processing with RF energy is generally known, for example, from conventional microwave ovens.

SUMMARY

An aspect of some embodiments of the invention includes an apparatus for sensing and processing an object in a cavity. The apparatus may include:
- a sensing RF source and a sensing antenna;
- a processing RF source and a processing antenna; and
- a protecting system, wherein;
  - the sensing RF source is configured to generate low power RF radiation at a first frequency range;
  - the sensing antenna is configured to feed the cavity with RF radiation generated by the low power RF source;
  - the processing RF source is configured to generate high power RF radiation at a second frequency range;
  - the processing antenna is configured to feed the cavity with RF radiation generated by the processing RF source; and
  - the protecting system is configured to protect the sensing RF source from RF radiation generated by the processing RF source.

In some embodiments, the power of the high power RF radiation is at least 10 times higher than the power of the low power RF radiation.

In some embodiments, the apparatus includes a detector configured to detect RF radiation returning from the cavity at the first frequency range.

In some embodiments, the protecting system comprises an RF filter configured to allow less than 10% of power received by the sensing antenna in the second frequency range to pass towards the sensing RF source.

In some embodiments, the apparatus includes a switch configured to connect or disconnect between the sensing RF source and the sensing antenna.

In some embodiments, the apparatus includes a processor configured to control the switch to disconnect between the sensing RF source and the sensing antenna whenever high power RF radiation is fed into the cavity.

In some embodiments, the sensing RF source comprises a solid state RF source.

In some embodiments, the processing RF source comprises a magnetron.

In some embodiments, both the sensing RF source and the processing RF source comprise solid state RF sources.

In some embodiments, the apparatus includes a processor, configured to control the processing RF source based on readings of the detector.

In some embodiments, the protecting system is configured to protect the detector from RF radiation generated by the processing RF source.

In some embodiments, the apparatus includes:
- a memory, storing a plurality of sets of RF processing instructions;
- a user interface, configured to receive identification of an object to be heated from a user; and
- a processor configured to:
  - receive from the user interface indication of the identification of the object;
  - select a set of processing instructions from the plurality of processing instructions, based on the indication; and
  - control the processing RF source to execute the selected set of processing instructions.

In some embodiments, each set of processing instructions comprises one or more excitation setups, each associated with at least one of a duration, a timing and a power level for which said each excitation setup is to be applied.

In some embodiments, the processor is configured to control the processing RF source based on the selected set of processing instructions and readings of a detector configured to detect RF radiation returning from the cavity at the first frequency range.

In some embodiments, the apparatus includes a plurality of processing antennas configured to feed the cavity coherently with each other.

In some embodiments, each set of processing instructions comprises a plurality of excitation setups, each excitation setup comprising:
- amplitudes, each of which is associated with one of the plurality of processing antennas, and one or more phase differences, each of which being associated with a pair of processing antennas associated with non-zero amplitudes.

In some embodiments, the processor is configured to adjust the time durations based on readings of the detector.

An aspect of some embodiments of the invention includes an apparatus for processing an object, the apparatus comprising:
- a cavity for receiving therein the object;
- a plurality of processing antennas configured to coherently feed the cavity with RF radiation generated by a processing RF source;
- a memory storing processing instructions for each object from a given group of objects,
- a user interface, configured to receive identification of an object to be processed from a user; and
- a processor configured to:
  - receive from the interface indication of the identification of the object;
  - select a processing instruction based on the indication; and
  - control the processing RF source to radiate according to the selected processing instruction,
  wherein the energy processing instruction comprises a plurality of excitation setups, each excitation setup of said plurality of excitation setups comprising:
  - amplitudes, each of which is associated with one of the plurality of antennas, and one or more phase differences associated with each two antennas associated with non-zero amplitudes.

In some embodiments, each processing instruction further comprises time durations, for each of which RF radiation is to be radiated at one of the excitation setups.

In some embodiments, the apparatus includes a detector, configured to detect RF radiation returning from the cavity, and wherein the processor is configured to control the processing RF source based on the selected processing instruction and readings of the detector.

In some embodiments, the apparatus includes a detector, configured to detect RF radiation returning from the cavity, and wherein the processor is configured to adjust the time durations based on readings of the detector.

In some embodiments, the apparatus includes a sensing RF source and one or more sensing antennas for feeding low power RF radiation from the sensing RF source to the cavity, and wherein the detector is configured to detect RF radiation received through the one or more sensing antennas configured to feed the low power RF radiation into the cavity.

In some embodiments, the sensing RF source supplies RF radiation at a first frequency range, and the processing RF source is configured to supply RF radiation at a second frequency range.

In some embodiments, the apparatus further includes a protecting system, configured to protect the sensing RF source from radiation at the first frequency range.

An aspect of some embodiments of the invention includes a method of processing an object residing in a cavity by heating, drying, and/or thawing the object, the method comprising:

operating a processing RF source to feed the cavity with high power RF radiation of a second frequency range through a processing antenna; and operating a sensing RF source, protected from RF radiation originating in the processing RF source, to feed the cavity with low power RF radiation of a first frequency range through a sensing antenna.

An aspect of some embodiments of the invention includes a method of processing an object residing in a cavity by heating, drying, and/or thawing the object, the method comprising:

operating a processing RF source to feed the cavity with high power RF radiation of a second frequency range through a processing antenna;

operating a sensing RF source, to feed the cavity with low power RF radiation of a first frequency range through a sensing antenna; and operating a protecting system that protects the sensing RF source from RF radiation originating in the processing RF source.

In some embodiments, the method may include detecting RF radiation returning from the cavity at the first frequency range; and controlling application of high power RF radiation to the cavity based on the detected RF radiation.

In some embodiments, the method may include operating the sensing RF source and the processing RF source during overlapping time periods.

In some embodiments, the power of the high power RF radiation is at least 10 times higher than the power of the low power RF radiation.

In some embodiments, operating the protecting system comprises filtering radiation received through the sensing antenna from radiation having frequencies in the second frequency range.

In some embodiments, operating the protecting system comprises disconnecting the sensing RF source from the sensing antenna when the cavity is fed with high power RF radiation.

In some embodiments, operating the protecting system comprises disconnecting the sensing RF source from the sensing antenna whenever the cavity is fed with high power RF radiation through the processing antenna.

An aspect of some embodiments of the invention includes a method of heating together two materials, each in its own compartment, to temperatures within a single predetermined temperature range in a single RF cavity, the method comprising:

a) operating a sensing RF source to feed the cavity with a plurality of sensing excitation setups;

b) estimating a temperature of a first material and a temperature of a second material based on electrical responses of the cavity to the application of RF radiation at the plurality of sensing excitation setups;

c) selecting, based on the estimated temperature of the first material and of the second material, a first group of heating excitation setups and a second group of heating excitation setups;

d) operating a processing RF source to feed the cavity with the first and second groups of processing excitation setups so as to heat the first and second materials;

e) adjusting the RF energy application from the processing RF source at the first group of processing excitation setups when it is estimated that the temperature of the first material is within the predetermined temperature range; and f) adjusting the RF energy application from the processing RF source at the second group of processing excitation setups when it is estimated that the temperature of the second material is within the predetermined temperature range.

In some embodiments, processing and sensing is done concurrently.

In some embodiments, the method includes operating a protecting system to protect the sensing RF source from energy received at excitation setups used for processing.

In some embodiments, when it is estimated that the first material reached an intermediate target temperature, a third group of processing excitation setups is read from the memory, and used instead of the first group of heating excitation setup.

In some embodiments, when it is estimated that the second material reached an intermediate target temperature, a fourth group of processing excitation setups is read from the memory, and used instead of the second group of processing excitation setup.

An aspect of some embodiments of the invention includes a method of processing together a plurality of materials, each in its own compartment, to temperatures within a single predetermined temperature range in a single RF cavity, the method comprising:

applying RF energy to the cavity so as to heat the materials in the compartments;

applying RF energy to the cavity at a plurality of sensing excitation setups;

estimating the temperature at each compartment based on electrical response of the cavity to RF energy applied at the plurality of sensing excitation setups;

changing the application of the RF energy when it is estimated that one of the compartments is at a temperature within the predetermined temperature range so as not to heat further said one of the compartments; and stopping the application of the RF energy when it is estimated that all of the compartments are at temperatures within the predetermined temperature range.

An aspect of some embodiments of the invention includes a method of heating at least two different materials held in at least two different parts of a container placed in a cavity, comprising:

(a) applying to the cavity low power RF radiation at a first frequency range;

(b) receiving RF radiation returning from the cavity at the first frequency range; and (c) selecting, based on the received RF radiation, at least two sets of processing instructions for heating the at least two different materials, wherein the at least two sets of processing instructions are selected from a plurality of sets of processing instructions, comprising a first set of processing instructions that if executed mainly heats a first part of the container and a second set of processing instructions that if executed mainly heats a second part of the container.

In some embodiments, the plurality of processing instructions comprises at least one processing instructions that if executed heats the at least two different parts substantially to the same degree.

In some embodiments, each processing instructions comprises:

applying high power RF energy at a frequency within a second frequency range, different from the first frequency range.

In some embodiments, the lowest frequency of the first frequency range is higher than the higher frequency of the second frequency range.

In some embodiments, each processing instruction comprises: at least one excitation setup associated with a duration, a power level, or a duration and a power level for applying each of the at least one excitation setup.

In some embodiments, the lowest frequency in the first frequency range is higher than the highest frequency in the second frequency range by at least 500 MHz.

In some embodiments, the processing instructions comprise:

applying each frequency through a plurality of antennas during overlapping time periods.

In some embodiments, the RF energy applied in high power is at least 10 times higher than the RF energy applied at low power.

In some embodiments, the method includes determining a target temperature and automatically repeating steps (a), (b) and (c), until a temperature of at least one part of the container reaches the target temperature.

In some embodiments, the method includes:

determining a target temperature for each part of the container: and automatically repeating steps (a), (b) and (c) until each part of the container reaches the target temperature determined.

An aspect of some embodiments of the invention includes an apparatus for heating at least two different materials held in at least two different parts of a container placed in a cavity, comprising:

a memory storing a plurality of processing instructions comprising:
  a first processing instruction, associated with a first part of the container, that if executed mainly heats the first part of the container, and
  a second processing instruction, associated with a second part of the container, that if executed mainly heats the second part of the container; and
a processor configured to:
  cause application of RF energy to the cavity at frequencies of a first frequency range, wherein the RF energy is applied at low power;
  receive signals indicative of RF radiation returning from the cavity at the frequencies of the first frequency range;
  select, based on the received signals, one or more processing instruction from the plurality of processing instructions stored in the memory for heating at least one of the at least two different materials; and cause application of the selected one or more processing instructions.

In some embodiments, the apparatus includes a sensing RF source and a sensing antenna to apply RF energy at low power and at the first frequency range, and receive a feedback in response to the application of the RF energy at the frequencies of the first frequency range.

In some embodiments, the apparatus includes a processing RF source and a processing antenna to apply to the cavity RF energy at high power and at frequencies of a second frequency range.

In some embodiments, the RF energy applied in high power is applied at power level at least 10 times higher than the power level at which RF energy is applied at low power.

In some embodiments, the processor is programmed to operate the RF processing source based on the signals received in response to the application of the RF energy at the first frequency range by the RF sensing source.

In some embodiments, the apparatus includes an interface configured to receive input indicative of an identification of the container, and the processor is configured to receive from the interface data indicative of the input, and programmed to select the processing instructions based on:
  the signals received in response to the application of the RF energy at the frequencies of the first frequency range by the RF sensing source; and
  the input received from the interface.

In some embodiments, the interface includes a reader for a machine readable data carrier.

In some embodiments, the machine readable data carrier carries machine readable data encoding an identity of the object.

In some embodiments, the machine readable data carrier carries data allowing access to a memory remote from the apparatus and retrieving from the memory remote from the apparatus data indicative of the identification of the object.

In some embodiments, the processor is programmed to determine a target temperature range, and to operate the RF sensing source and the RF processing source until the feedback received is indicative of a temperature of at least one part of the object being within the target temperature range.

In some embodiments, the frequencies at the first range include frequencies outside ISM bands, and the frequencies in the second frequency range include only frequencies within ISM bands.

In some embodiments, the cavity comprises dielectric material shaped to receive therein the container.

In some embodiments, the dielectric material has a dielectric constant of between 3 and 10.

In some embodiments, the dielectric material has a loss tangent smaller than 0.01.

DETAILED DESCRIPTION

Overview

Figures 4, 5:
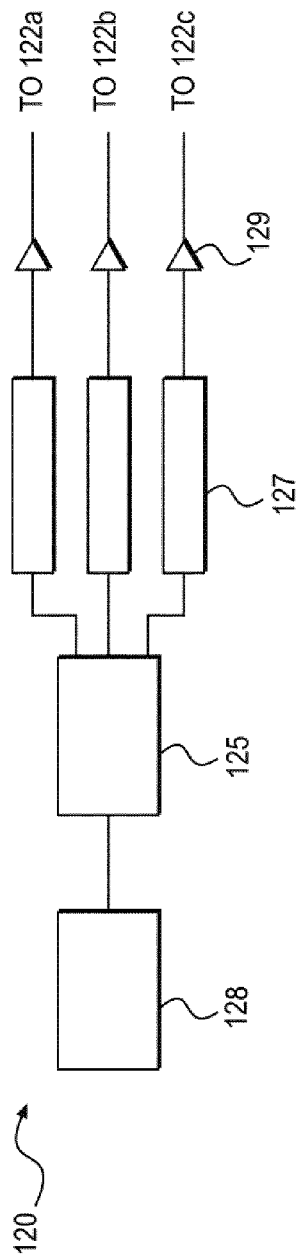
FIG. 4 is a diagrammatic illustration of an exemplary processing RF source, according to some embodiments of the invention.
FIG. 5 is a diagrammatic illustration of an exemplary table comprising processing instructions according to some embodiments of the invention.

Some embodiments relate to apparatuses for processing objects with RF using two frequency bands: one band may be used for the processing, and the other band may be used for sensing, e.g., for monitoring progress of the processing. The sensing may be carried out in a first frequency range using power levels smaller than the heating power levels by at least 4 orders of magnitude, for example, 5 orders of magnitude. For example, in some embodiments, the sensing may be done at low power (e.g., 1-50 mW), while the processing may be done at high power (e.g., 100-1000 W). The heating or processing may be carried out in a second frequency range. The frequency ranges may differ by a factor of 2 or more, for example, the central frequency of the first frequency range may be twice higher (or, in some embodiments, twice lower) than the central frequency of the second frequency range. Therefore, it could have been expected that the heating would not affect the sensing. However, the inventors found that at times, despite of the large difference in frequencies, the sensors sense some of the radiation used for processing, and this small portion of processing energy may be sufficient to damage the sensing circuits. Therefore, in some embodiments, the sensing circuits may be protected from receiving any radiation in the frequency band used for the processing, for example, by a filter that filters the processing frequency band away from the sensing circuitry. In some embodiments, the protection may include an arrangement that ensures disconnection between the sensing antenna and the sensing circuit (e.g., the sensing microwave generator) when processing takes place. This arrangement may include an RF switch, for example, as illustrated in FIG. 4, below.

In some embodiments, sensing may be provided using the second range of frequencies (i.e., the processing frequency band), and in some cases, using the same antennas used for the processing. This sensing may be instead of, or in addition to sensing using a frequency band different from that used for processing.

Some embodiments relate to apparatuses configured to process some objects of predetermined kinds. The apparatuses may be configured to receive indication on the exact type of object to be processed (and on the kind of processing required, e.g., thawing, thawing and cooking, drying, etc.), and control an RF source to radiate so as to accomplish the defined mission (e.g., thawing a frozen 12" pizza and cooking it) precisely and efficiently. In some embodiments, this is accomplished by reading from a memory processing instructions prepared in advanced for an object member of a group of some objects (e.g., pizzas of various sizes or toppings). In some embodiments, the processing instructions may include the amplitude of signals emitted by two or more antennas simultaneously. In some embodiments, the instructions may also include frequencies, phase differences between signals emitted by the two or more antennas, which antenna is to emit and which is not, etc.

The processing may be accompanied by sensing as described above. For example the indication of the kind of object may be obtained from sensing the kind of object. For example, the sensing may include radiating RF energy at low power to a cavity holding the object, measuring the electrical response of the cavity to the radiated RF energy, and identifying the object based on this response. The response may be characterized, for example, by graphs, functions, tables, or other means of associating response indicators with excitation setups. Response indicators may include any variable indicative of a feedback received from the cavity holding the object to the applied RF energy, for example, scattering parameters, dissipation ratios, and reflectivities.

An excitation setup may include any set of values of field affecting parameters controllable by the apparatus, as explained in more detail below. Association of response indicators to excitation setups that triggered the response may be used as a "finger print" to be used in identifying the object, or in estimating the state of the object during processing (e.g., the temperature it reached). Thus, the sensing may be combined with the pre-prepared processing instructions to improve heating efficiency and/or accuracy.

The drawings and detailed description which follow contain numerous alternative examples consistent with the invention. For a more detailed description of exemplary aspects of the invention, reference should be made to the drawings, and claims, which are incorporated herein by reference.

Reference will now be made in detail to exemplary embodiments of the invention, examples of which are illustrated in the accompanying drawings. When same reference numbers are used throughout the drawings they refer to the same or like parts.

Figure 1:
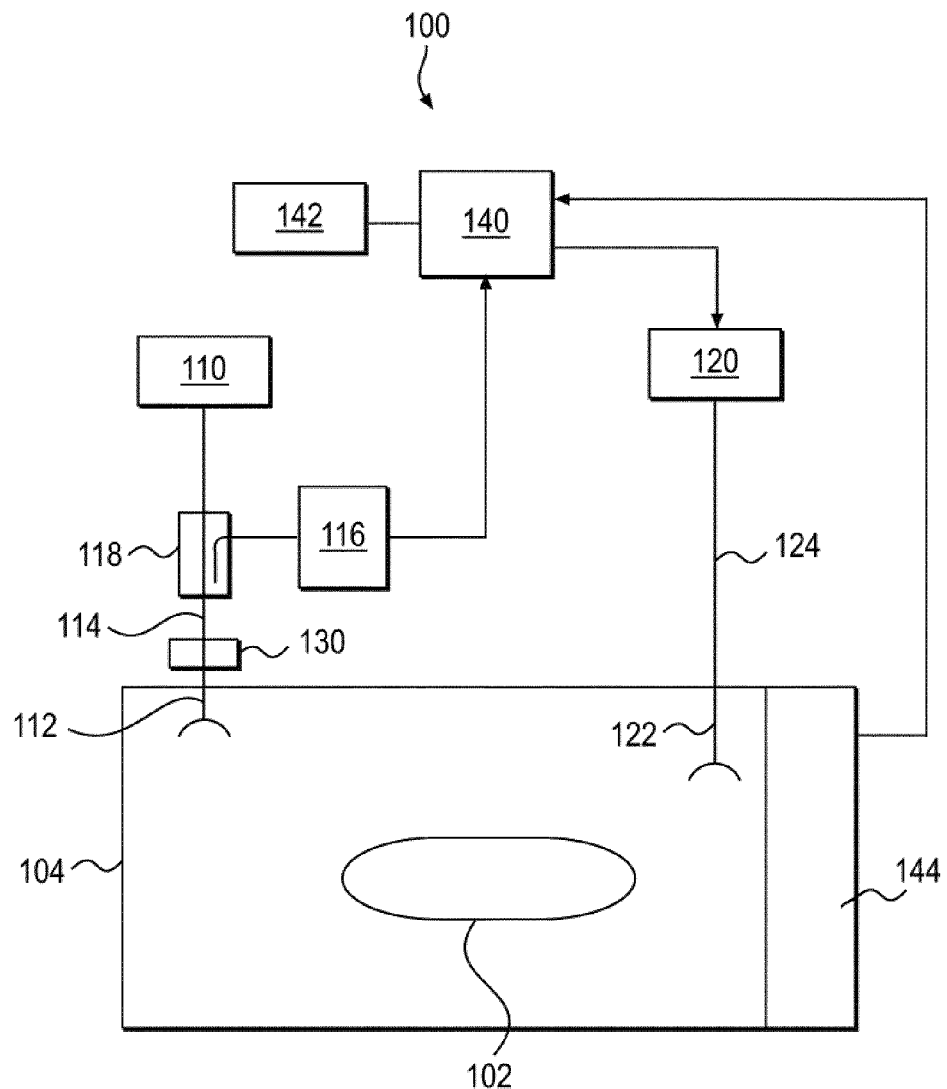
FIG. 1 and FIG. 3 are diagrammatic illustrations of an exemplary apparatuses for processing objects according to some embodiments of the invention.

FIG. 1 is a diagrammatic illustration of an apparatus (100) for processing an object (102) in a cavity (104) according to some embodiments of the invention. Apparatus 100 may include a low power microwave generator included in a sensing RF source 110, and a high power microwave generator included in a processing RF source 120. Apparatus 100 may also include a sensing antenna (112); a processing antenna (122); and a protecting system (130). Some embodiments may include a plurality of sensing antennas, nevertheless, these will be collectively referred to as sensing antenna 112. Similarly, some embodiments may include a plurality of processing antennas that will be referred to collectively as processing antenna 122. If a particular one of the processing antennas is referred to, it may be marked with a letter, like 122a, 122b, etc.

References to an "object" (or "object to be heated"), to which electromagnetic energy is applied, is not limited to a particular form. An object may include a liquid, semi-liquid, solid, semi-solid, or gas, depending upon the particular process with which the invention is utilized. The object may also include composites or mixtures of matter in differing phases. Thus, by way of non-limiting example, the term "object" encompasses such matter as food to be defrosted or cooked; clothes or other wet material to be dried; frozen organs to be thawed; chemicals to be reacted; fuel or other combustible material to be combusted; hydrated material to be dehydrated, gases to be expanded; liquids to be heated, boiled or vaporized, or any other material for which there is a desire to apply, even nominally, electromagnetic energy. In some embodiments, the object may include at least two different materials held in at least two different parts of a container, for example, a two compartment syringe comprising a different material in each compartment.

Processing the object may include application of RF energy (e.g., microwave energy) to a cavity (104), in which the object resides during processing by the RF energy.

The term RF energy, as used herein, includes energy deliverable by electromagnetic radiation in the radio frequency portion of the electromagnetic spectrum, including wavelengths in free space of 1 m to 1 mm, which correspond to frequencies of 300 MHz to 300 GHz, respectively. Microwave and ultra-high frequency (UHF) energy, for example, are both within the RF range. In some examples, the applied electromagnetic energy may fall only within one or more ISM frequency bands, for example, between 433.05 and 434.79 MHz, between 902 and 928 MHz, between 2400 and 2500 MHz, and/or between 5725 and 5875 MHz. In some embodiments, high power may be applied only within ISM frequency bands, while low power may be applied at frequencies out of any ISM frequency band, for example, 2-5 GHz. The term RF radiation, as used herein, includes electromagnetic radiation in the radio frequency portion of the electromagnetic spectrum.

Cavity 104 may include an interior of an enclosure or of partial enclosure that allows existence, propagation, and/or resonance of electromagnetic waves in the frequency range used for processing the object. The term cavity may also be used to refer to the enclosure itself. In some embodiments, a cavity may have a cutoff frequency, below which no electromagnetic wave propagates or resonates in the cavity. The RF used for processing may include, in some embodiments, frequencies higher than the cutoff frequency. In some embodiments, the cutoff may be shifted when the object is in the cavity (in respect to a cutoff of an empty cavity). The RF used for processing may include frequencies higher than the shifted cutoff, characterizing the cavity with the object therein. The enclosure may be made of materials that reflect RF energy at the applied frequencies, for example, metals, metal oxides, metallic alloys, or other electrically conducting materials.

The processing may include heating, drying, thawing, cooking, or any other processing that causes the object or a property thereof to change and may be accomplished by applying energy to the object.

Apparatus 100 may include a sensing RF source 110 configured to generate low power RF radiation at a first frequency range. Sensing RF source 110 may include a solid state microwave generator, for example, source 110 may include a voltage controlled oscillator (VCO); a direct digital synthesizer (DDS), or any other means known in the art useful for providing low power microwaves. Sensing RF source 110 may include a variable frequency generator, configured to generate RF signals at various frequencies and in a controlled manner.

Apparatus 100 may further include sensing antenna 112, configured to feed cavity 104 with RF originating in sensing RF source 110. In some embodiments, there may be two, three, four, or any other number of sensing antennas 112.

As used herein, the term antenna may refer to any structure configured to convert electric currents into radio waves and vice versa. For example, an antenna may include an aperture antenna, a slot antenna, a monopole, a dipole, a loop antenna, an inverted F antenna, or a phased array antenna. A phased array antenna may include a plurality of terminals transmitting at overlapping time periods and at a common frequency. In a phased array antenna, phase differences may be controlled, and in some embodiments, may be controlled to change during operation.

In some embodiments, being configured that way may include being connected with a transmission line (e.g., transmission line 114) to sensing RF source 110. Transmission line 114 may include a waveguide, for example, a rectangular waveguide or a coaxial waveguide. Transmission line 114 may also include other RF components, for example, circulators, couplers (e.g., directional couplers, dual directional couplers, bi-directional couplers), insulators, and/or RF switches. Optionally or additionally, being configured that way may include being sized to radiate and receive radiation at the first frequency range. For example, it is well known in the art that longer antennas are more suitable to transmit and receive radiation of longer wavelength, with a preference towards antennas having length of half the wavelength of the frequency they are configured to transmit and/or receive. Furthermore, being configured to feed cavity 104 with RF originating in sensing RF source 110 may include being of relatively thin dimensions, which may be sufficient to carry the low power generated by sensing RF source 110.

Apparatus 100 may include a processing RF source 120 configured to generate high power RF radiation at a second frequency range. Processing RF source 120 may include, for example, a magnetron or a solid state microwave generator. In the context of the present disclosure, high power RF may include RF at powers of at least 10 W, for example, between 10 W and 10 kW. Low power RF may include RF at powers of up to 1 W, for example, from 1 mW to 1 W. In some embodiments, the power of the high power RF radiation may be at least 10 times higher than the power of the low power RF radiation, for example, the high power RF radiation may be 10 W and the low power RF radiation may be 1 W.

Apparatus 100 may further include processing antenna 122, configured to feed cavity 104 with RF radiation originating in processing RF source 120 at the second frequency range. In some embodiments, being configured that way may include being connected with a transmission line (e.g., transmission line 124) to sensing RF source 110. Transmission line 124 may include a waveguide, for example, a rectangular waveguide or a coaxial waveguide. Transmission line 124 may also include other RF components, for example, circulators, couplers, insulators, and/or RF switches.

Optionally or additionally, being configured to feed cavity 104 with RF radiation originating in processing RF source 120 may include being sized to radiate and receive radiation at the second frequency range. Furthermore, being configured to feed cavity 104 with RF radiation originating in processing RF source 120 may include being of relatively thick dimensions, which may be sufficient to carry the high power generated by generator 120.

The first frequency range may include any sub-range of the radio frequency range, for example, between 300 MHz and 3 GHz. The second frequency range may also be any sub-range of the radio frequency range. In some embodiments, however, the first and second frequency ranges may each comprises different frequencies, for example the two ranges may have a zero overlap or a small overlap, for example, of up to 20%, 10%, or 5% of the narrower of the first and second frequency ranges. In some embodiments, the lowest frequency in the first frequency range may be higher than the highest frequency in the second frequency range, for example, by 500 MHz or more, or by 50% of the central frequency of the lower frequency range. In one example, the first frequency range is 2-5 GHz and the second frequency range may be 902-928 MHz.

Apparatus 100 may further include a protecting system 130 configured to protect sensing RF source 110 from RF radiation originating in processing RF source 120. It is noted that when the first and second frequency ranges are different, such a protecting system may be considered redundant, because the sensing antenna is not configured to receive radiation at the second frequency range, e.g., because it is not of the suitable length. The inventors, however, surprisingly found that this protection is not sufficient, and that the sensing RF source may be damaged by RF radiation at the second frequency range despite of the attenuation of this radiation by the non-suitable antenna. In some embodiments, each frequency range has a central frequency, and the central frequency of the first frequency range may be different (i.e., smaller or larger) than the central frequency of the second frequency range by a factor of at least 2. In some embodiments, the lowest frequency of the higher frequency range is larger by a factor of 2 or more than the highest frequency of the lower frequency range.

Figure 2B:
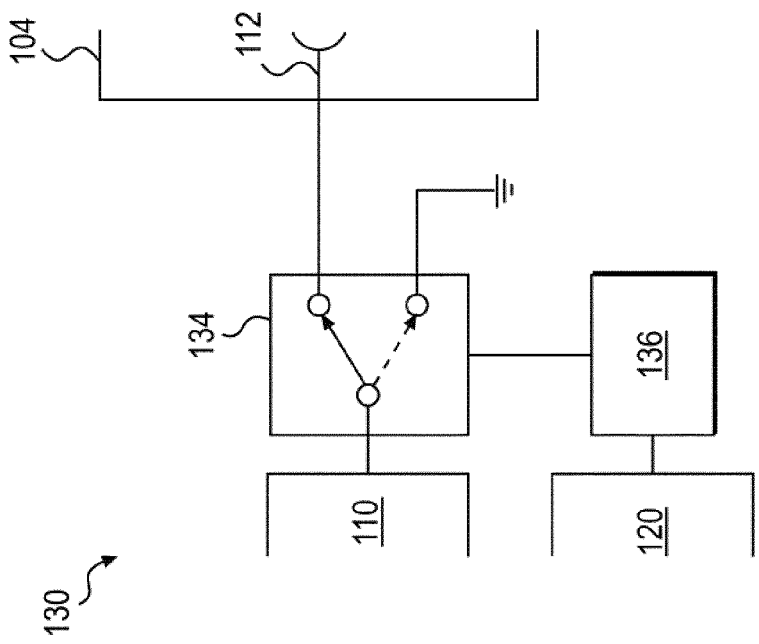
FIG. 2A and FIG. 2B are diagrammatic illustrations of an exemplary protecting systems configured to protect the sensing circuit from being damaged by processing radiation, according to some embodiments.
Figure 2A:
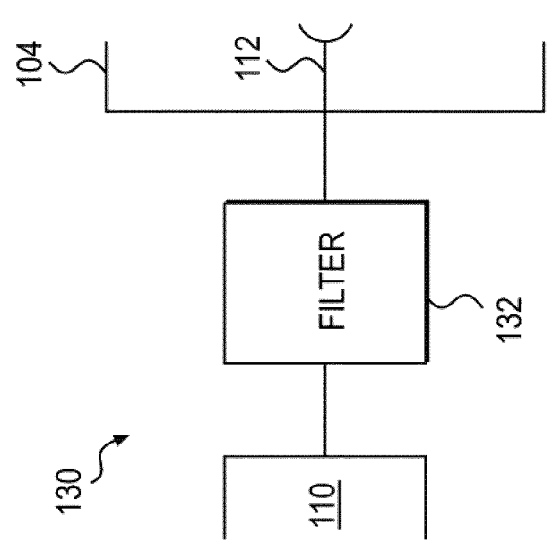

FIG. 2A is a diagrammatic illustration of protecting system 130 according to some embodiments. In the embodiment illustrated in FIG. 2A, protecting system 130 includes an RF filter 132 configured to allow only a portion (e.g., less than 10%, less than 1%, or smaller or intermediate portion) of power received by the sensing antenna in the second frequency range to pass towards the sensing RF source. In some embodiments, for example, when the first frequency range is higher than the second, filter 132 may be a high pass filter. When the first frequency range is lower than the second, filter 132 may be a low pass filter. The embodiment illustrated in FIG. 2A may allow operation of processing RF source 120 and sensing RF source 110 at overlapping time periods.

FIG. 2B is a diagrammatic illustration of protecting system 130 according to some embodiments. In the embodiment illustrated in FIG. 2B, protecting system 130 includes a switch 134 configured to connect or disconnect between sensing RF source 110 and the sensing antenna 112. When disconnecting between sensing RF source 110 and sensing antenna 112, switch 134 may ground sensing RF source 110, e.g., to cavity 104 or to any other ground port. In some embodiments, switch 134 may connect sensing RF source 110 to an open port, rather than to ground. In some embodiments, switch 134 may be controlled to prevent concurrent operation of RF sources 110 and 120. In some embodiments, switch 134 may be controlled by a controller 136 (e.g., a processor), which is configured to control switch 134 to disconnect between sensing RF source 110 and sensing antenna 112 whenever processing RF source 120 feeds cavity 104. In some embodiments, controller 136 may also control processing RF source 120, and before operating processing RF source 120 disconnects sensing RF source 110 from sensing antenna 112. For example, processing RF source 120 may be a magnetron that outputs RF radiation at a duty cycle. Controller 136 may send control signals to magnetron 120 to start and stop operating according to the duty cycle, and control switch 134 to disconnect sensing RF source 110 from sensing antenna 112 before sending each "start" control signal it sends to the magnetron. In another example, the low power generator (e.g., sensing RF source 110) may be used for monitoring the state of object 102. In some embodiments, such monitoring may be done periodically, for example, every minute, every 5 minutes, or at any other time intervals.

In some embodiments, controller 136 may send a "connect" signal to switch 134 each time monitoring is required, and may send a "stop" signal to processing RF source 120 just before sending the "connect" signals. When monitoring is complete, controller 136 may send a "disconnect" signal to the switch, followed by a "start" signal to processing RF source 120. In some embodiments, processing RF source 120 may include a magnetron that operates only at half the periods of the mains. Switch 134 may be connected to the mains (optionally, via controller 136), such that sensing RF source 110 is connected to sensing antenna 112 only when there is no current through the magnetron; sensing RF source 110 is disconnected from sensing antenna 112 just before current through the magnetron is renewed.

Returning to FIG. 1, apparatus 100 may also include a detector (116), configured to detect RF radiation returning from the cavity, e.g., at the first frequency range. Optionally, protecting system 130 may protect detector 116 from receiving radiation in the second frequency range. Detector 116 may be connected to sensing antenna 112, for example, through coupler 118, which samples a predetermined portion of the low power RF radiation received by sensing antenna 112 from cavity 104. This predetermined portion may be detected by detector 116 (which may include a power meter). In some embodiments, detector 116 may also include a phase detector, and detect the phase of radiation received through sensing antenna 112 (e.g., in relation to the phase of radiation transmitted into cavity 104 through sensing antenna 112). In some embodiments, detector 116 (or another detector, not shown) may be configured to detect the power at which RF is radiated into cavity 104 through sensing antenna 112. The ratio between the received power and the transmitted power may be referred to as the reflectivity (R). A part of the transmitted power that is not returned from the cavity may be referred to as dissipated power, and the ratio between dissipated and transmitted power may be termed dissipation ratio (DR). If there is only a single sensing antenna 112, then DR=1−R. In some embodiments, the reflectivity or the dissipation ratio may be used for controlling processing RF source 120.

For this end, apparatus 100 may further include a processor (140), configured to control processing RF source 120 based on readings of detector 116. As used herein, the term "processor" may include an electric circuit that performs a logic operation on input or inputs. For example, such a processor may include one or more integrated circuits, microchips, microcontrollers, microprocessors, all or part of a central processing unit (CPU), graphics processing unit (GPU), digital signal processors (DSP), field-programmable gate array (FPGA) or other circuit suitable for executing instructions or performing logic operations.

The instructions (e.g., processing instructions) executed by the processor may, for example, be pre-loaded into the processor or may be stored in a separate memory unit such as a RAM, a ROM, a hard disk, an optical disk, a magnetic medium, a flash memory, other permanent, fixed, or volatile memory, or any other mechanism capable of storing instructions for the processor. The processor(s) may be customized for a particular use, or can be configured for general-purpose use and can perform different functions by executing different software.

If more than one processor is employed, all may be of similar construction, or they may be of differing constructions electrically connected or disconnected from each other.

They may be separate circuits or integrated in a single circuit. When more than one processor is used, they may be configured to operate independently or collaboratively. They may be coupled electrically, magnetically, optically, acoustically, mechanically or by other means permitting them to interact. When more than one processor is used, they may be referred to collectively as a processor.

For example, processor 140 may receive from detector 116 (and possibly also from other detectors) signals, that together allow the processor to determine the dissipation ratio. The controller may be configured (e.g., programmed) to control processing RF source 120 based on the value of DR. For example, in some embodiments, DR may be measured at a plurality of frequencies using low power RF generated by sensing RF source 110. The function DR vs. frequency may be used as fingerprints for identifying object 104.

Thus, in some embodiments, apparatus 100 may be configured to heat objects from a given group of objects, for example, blood product units of various sizes, biological adhesive, two-compartment syringe and heat each specific object in the group (e.g., a 250 ml bag with blood plasma) according to a set of processing instructions associated with the specific object. Apparatus 100 may include a memory (142), storing a plurality of sets of processing instructions, including at least one instruction or set of instructions specifying how to heat one object from the given group of objects. In some embodiments, apparatus 100 may also include a user interface (144), configured to receive identification of an object to be heated from a user. In some embodiments, user interface 144 may include a keypad, a barcode reader, an RFID reader, and/or any other mechanism that allows a user to indicate an identification of the object in a machine-readable manner. Processor 140 may be configured to receive from user interface 144 indication of the identification of object 102; select a set of processing instructions among the sets of processing instruction saved in memory 142 based on the indication; and control processing RF source 120 to heat object 102 according to the instructions included in the selected set of processing instructions. In some embodiments, in addition or as an alternative to receiving the identification through a user interface, the identification may be obtained based on readings of detector 116. For example, in some embodiments, apparatus 100 may be configured to thaw samples of a given material at several predetermined volumes (e.g., 10 ml; 25 ml; and 100 ml). Each volume may have its own fingerprint. Processor 140 may include a memory (or may be connected to an external memory (142) that stores sets of processing instructions, each associated with one object, for example, with a sample of a given volume. Once the volume is identified based on fingerprints obtained using sensing RF source 110, processor 140 may select the suitable set of processing instructions and operate processing RF source 120 based on the instructions included in the selected set.

In some embodiments, a set of processing instructions may include frequencies, and for each frequency a power level and a duration. In such embodiments, processor 140 may control processing RF source 120 to generate power at the frequencies and power levels and for the durations listed in the selected heating table. In some embodiments, the processing instructions may include a plurality of excitation setups and the duration, the timing and the power level for each of the excitation setups. The timing for an excitation setup may be, for example, the position of the excitation setup in an order by which the excitation setups are applied, for example, which excitation setup is to be applied first, second, third, etc.

In some embodiments, processor 140 may be configured to control processing RF source 120 based on both the selected set of processing instructions and readings of detector 116. For example, the sets of processing instructions may include different sets, each for heating objects starting at a different temperature (e.g. one set of instructions for thawing a sample starting at a temperature of −80° C., and one set of instructions for thawing a sample starting at a temperature of −20° C.) Readings from detector 116 may be used to estimate the temperature of the identified object, and only the relevant set of instructions will be executed. In some embodiments, as the temperature of the object changes, this change is monitored by comparing readings of detector 116 with saved fingerprints, and instructions included in the processing instructions may be executed according to the detected temperature at every instant. In such a case, a set of heating instructions may include subsets of instructions, and indications at what temperature to carry out each sub-set of instructions.

Figure 3:
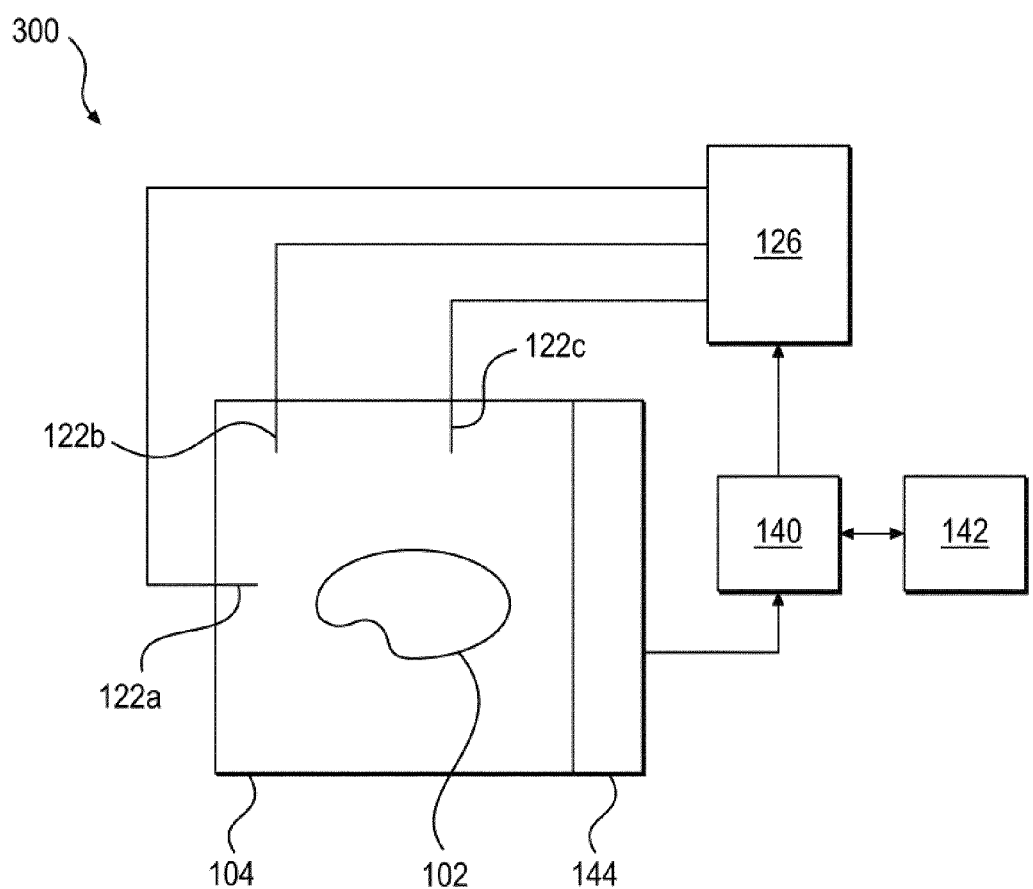

FIG. 3 is a diagrammatic illustration of an apparatus 300 according to some embodiments of the invention. Apparatus 300 may be suitable for processing an object by heating, drying, and/or thawing, by RF energy. Apparatus 300 may include cavity 104 for receiving therein object 102; and a plurality of processing antennas (122a, 122b, 122c) configured to coherently feed cavity 104 with RF radiation generated by a processing RF source 120. In the context of the present disclosure and claims coherent feeding may be any feeding, through two or more antennas at overlapping time periods, radiation of the same frequency. Antennas may be configured to feed cavity 104 coherently, for example, by being all connected to the same processing RF source or by being connected to different processing RF sources configured to generate RF radiation of the same frequency at overlapping time periods.

Apparatus 300 may further include a memory (e.g., memory 142), which saves sets of processing instructions. Each set of processing instructions may include instructions how to heat one object from a given group of objects. Apparatus 300 may further include a user interface 144, configured to receive identification of object 102 from a user (not shown). Apparatus 300 may further include processor 140, which may be configured to receive from interface 144 indication of the identification of object 102; select a set of processing instructions among the sets saved in memory 142 based on the indication; and control processing RF source 120 to radiate according to the instructions included in the selected set of processing instructions.

In some embodiments, each set of processing instructions may include instructions to apply energy at a plurality of excitation setups. Applying energy at different excitation setups may result in excitation of different field patterns in cavity 104. The excitation setups (ES) may differ from one another by one or more values of parameters that may affect the field pattern and may be controlled by components of the apparatus, e.g., by processor 140. Such a parameter is referred to herein as a controllable field affecting parameter (c-FAP). In some embodiments, a value may be selected for each c-FAP, and the excitation setup may be defined by the selected values. Varying a selected value of even one c-FAP varies the excitation setup, which, in turn, may vary the field pattern excited in the energy application zone.

In some cases, varying values of c-FAPs may result in significant variations in the generated field patterns. In other instances, however, varying values of c-FAPs may produce little or no change in the generated field patterns (e.g., if the variation between the two values of the c-FAP is small).

To obtain a mental image of an excitation setup and how it may be set, one may imagine an energy application unit according to some embodiments of the invention to be controlled from a switchboard. The switchboard may include a set of knobs, dials, switches, or other value-selectors, each for determining the value of (or selecting a value for) one c-FAP. Switching from one excitation setup to another may be accomplished by manipulating one (or more) of the value-selectors to select a different value. The position of all the value selectors collectively (e.g., the positions of all the knobs, dials and switches collectively) may define a single excitation setup. While this mental image may be helpful, in practice, an energy application unit may be controlled by a processor, which may set the values of the available c-FAPs by using micro-switches, transistors, electronic circuitries, and other value selectors, which may look differently than knobs and dials.

Applying energy at a particular excitation setup may excite electromagnetic field in cavity 104. For brevity, this electromagnetic field may be referred to as an excitation. Thus, each excitation setup may correspond to an excitation; and a reference to supply, reception, absorption, leaking, etc. of an excitation setup may refer to supply, reception, absorption, leaking, etc. of the corresponding excitation. Thus, for example, a statement that a given excitation or excitation setup is absorbed in the object may mean that electromagnetic field excited by the energy application unit at the given excitation setup is absorbed in the object.

Different apparatuses may be able to control different field affecting parameters. For example, in some embodiments, the apparatus may include a processor 140 that may control the frequency of an electromagnetic wave applied to the cavity 104. In such apparatuses, the frequency may be available as a controllable field affecting parameter (c-FAP). In one example, such an apparatus processor 140 may control the frequency to have any of two or more values, e.g. 800 MHz, 800.5 MHz, etc. By controlling the frequency and changing from one frequency value to another, the excitation setup may be changed, which, in turn, may change the field pattern excited in the energy application zone.

In another example, an apparatus 100 may include two antennas that emit radiation at a controllable phase difference, e.g., at a common frequency and during overlapping time periods. The phase difference may be controlled by processor 140, to have two or more values, e.g., 0°, 90°, 180°, or 270°. The phase difference between electromagnetic fields emitted by the two antennas may be available to the apparatus as a c-FAP.

In another example, a difference between intensities at which two antennas emit electromagnetic fields of the same frequency and during overlapping time periods may be controlled, and thus may be available as a c-FAP.

In another example, a cavity (e.g., cavity 104) may include one or more conductive elements (e.g., rods), each of which may be controlled, e.g., by processor 140, to be either in a parasitic state or in a connected state. The value of the state of each rod (i.e. parasitic or connected) may affect the electromagnetic field pattern excited in the energy application zone. In apparatuses having such rods, the state of each rod may constitute a c-FAP.

In another example, a cavity may include a magnetizable element (e.g., at a wall of the energy application zone) and an electromagnet near the magnetizable element. The magnetizable element and the electromagnet may be arranged such that a field pattern excited in the energy application zone may be affected by current flowing in the electromagnet. In embodiments, processor 140 may be configured to control the value of the current (e.g., select between values of 1 mA, 20 mA, 500 mA, etc.). The value of the current may be available as a c-FAP.

In another example, each of a plurality of antennas may be turned on or off. In such embodiments, the status of each antenna (i.e., on or off) may be available as a c-FAP. Additionally, or alternatively, the total number of antennas turned on may constitute as a c-FAP.

Other examples of parameters that may serve as controllable field affecting parameters in some embodiments may include the position of a antenna, orientation of a antenna, position and/or orientation of conducting elements in the energy application zone, cavity dimensions, or any other controllable parameter, the value of which may affect the field pattern excited in the energy application zone upon RF energy application to the zone.

Excitation setups (ES) of apparatuses configured to control only a single c-FAP may be referred to as one-dimensional excitation setups. An excitation setup of an apparatus that controls multiple c-FAPs may be referred to as multi-dimensional excitation setup. For example, an apparatus configured to control the state of each of six rods to be either parasitic or connected may have six-dimensional excitation setups. Two examples of such excitation setups may be: (parasitic, parasitic, parasitic, connected, connected, connected), and (parasitic, connected, connected, parasitic, parasitic, connected). In general, the number of c-FAPs available to an apparatus determines a dimension of the excitation setups available to the apparatus. The collection of all the excitations that may be excited by an apparatus (or the collection of all the excitation setups available to an apparatus) may be referred to as the excitation space of the apparatus. The dimension of an excitation space of an apparatus may be the same as the dimension of each excitation setup available to that apparatus.

In some embodiments, each excitation setup in the set of processing instructions saved on memory 142 may include one amplitude and one or more phases. Each of the amplitudes may be associated with one of the plurality of antennas 122a, 122b, and 122c. Each of the one or more phase differences may be associated with two antennas associated with non-zero amplitudes. For example, in an exemplifying excitation setup antenna 122a may be associated with zero amplitude (which means that when energy is applied at this excitation setup antenna 122a is silent), antennas 122b and 122c may have amplitudes of 1 and 0.5, respectively (at some arbitrary units), and a phase difference between antenna 122b and 122c may be set to 60°. In another exemplifying excitation setup, where the amplitudes associated with each antenna 122a, 122b, and 122c is non-zero, there may be two phase differences (e.g., one difference between phases of radiation emitted by antennas 122a and 122b and one—between antennas 122a and 122c.)

In some embodiments, processing instructions saved in memory 142 may include time durations. For example, each excitation setup may be associated with a time duration, and when a set of processing instructions is executed, energy is applied at each excitation setup for the time duration associated with said excitation setup. Thus, each time duration may indicate for how long microwave is to be radiated at one of the excitation setups. In some embodiments, the durations may be adjusted, e.g., based on input received at detector 116, for example, processor 140 may be configured to adjust the time duration based on readings of the detector.

FIG. 4 is a diagrammatic illustration of a processing RF source 120, according to some embodiments of the invention. As shown, processing source 120 may include an RF radiation generator (e.g., a microwave generator) 128, configured to generate a signal, e.g., a sinusoidal signal, in the second frequency range. Generator 128 may include, for example, a voltage controlled oscillator, a signal generator, or any other arrangement configured to generate RF signals. Processing RF source 120 may further include a splitter 125, configured to split the signal to two or more signals. Splitter 125 may include, for example, two splitters (not shown individually), each of which splitting an incoming signal into two signals. Processing RF source 120 may further include phase shifters 127, for shifting the phase of the signal received in the phase shifter from the splitter, thus creating phase differences between signals emerging from the phase shifters. Processing RF source 120 may further include amplifiers 129, for amplifying the shifted signals. The output of each amplifier may go into one of processing antennas 122a, 122b, 122c (FIG. 3), which radiate to transmit the signal into the cavity. In an alternative embodiment, RF processing source may include a plurality of direct digital synthesizers, all synchronized to the same clock. Each synthesizer may generate a signal of controlled frequency, amplitude and phase. Synchronizing between the synthesizers may enable controlling phase difference between signals generated by each two synthesizers. The synthesized signals may then by amplified, and applied to the cavity through processing antennas 122.

FIG. 5 is a diagrammatic illustration of a set 500 of heating instructions arranged as a table. The processing instructions forming different sets of processing instructions may be stored in the memory (e.g., memory 142) in tables, such as table 500. Each raw in table 500 may include a processing instruction. For example, instruction 502 may mean: apply RF energy at frequency 905 MHz for 10 ms through antennas 122a and 122b at the same amplitude, while antenna 122c is silent, and a phase shift of 180° is between the radiation inputted into the cavity by antennas 122a and 122b. Instruction 504 may mean: apply RF energy at frequency 912 MHz for 7 ms through antennas 122a and 122b and 122c at the same amplitude, but half the amplitude used in instruction 502, and a phase shift of 120° is between the radiation inputted into the cavity by antennas 122a and 122b, and 150° between radiation inputted into the cavity be antennas 122a and 122c. Table 500 supplies instructions for heating a load for 17 ms. For longer heating processes, more processing instructions may be included in a set (table), and/or instructions to heat at each excitation setup for longer periods, and/or instructions to execute one or more of the instructions (lines) twice or more, for example, at a prescribed order.

EXAMPLE

Figure 6:
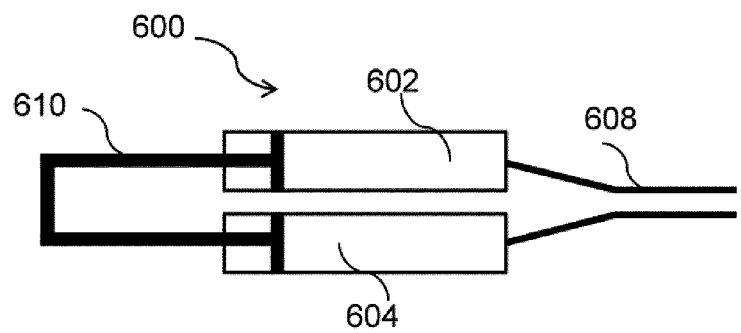
FIG. 6 is an illustration of an exemplary two-chamber syringe according to some embodiments of the invention.

Apparatus 100, diagrammatically illustrated in FIG. 1, may be used for heating two different materials held in at least two different parts of a container placed in a cavity, for example, to thaw frozen biological material provided in a syringe illustrated in FIG. 6. The container (e.g., the syringe) may include two or more parts (e.g., two or more compartments). Each part may hold a different material. In some embodiment, the container may be packed in a package during heating in the apparatus, and the apparatus may be configured to receive therein the package. For example, the apparatus may include a cavity filled with a dielectric material formed with a recess shaped for receiving the container or the container's package.

The apparatus may be configured to heat the two or more materials to the same final temperature at the same time. In some embodiments, one material may reach the target temperature before the other, and then, heating may be applied only to the other material, or heating may be provided to the already warm material only in an amount sufficient to keep it at the target temperature.

The apparatus may be configured to receive containers (e.g., syringes) of various sizes and configurations, and heat each by a set of processing instructions designed specifically for this size or configuration. A plurality of heating instructions may be stored in a memory (e.g., memory 142) and may include a first processing instruction or first set of processing instructions that if executed mainly heats a first part of the container and a second processing instruction or second set of processing instructions that if executed mainly heats a second part of the container. As used herein, the term "mainly heats" is referring to the ability of the executed heating instruction to apply more RF energy to one part of the container than to the other part. For example, a processing instruction that mainly heats the first part of the container may include excitation setups that excite field patterns in cavity 104 that have EM filed intensity maxima near or at the first part. Therefore, most of the RF energy applied may heat the first part, while smaller portion of the energy may heat the second part (i.e., the EM filed intensity near or at the second part is smaller than the EM field intensity near or at the first part). In some embodiments, the processing instructions may include at least one processing instruction that if executed heats the at least two different parts similarly, e.g., to temperatures within predetermined temperature range.

In some embodiments, an excitation setup or heating instruction is said to mainly heat a certain part of an object, if most of the RF energy absorbed by the object, is absorbed by the certain part. For example, an excitation setup mainly heats a first part of the object if more than 50%, more than 75%, more than 90%, or intermediate portions of the RF energy absorbed by the object is absorbed by the first part of the object. The fact that an excitation setup mainly heats a part of an object may be learned from measurements or simulations. In some embodiments, an excitation setup or heating instruction is said to mainly heat a certain part of an object, if it heats the one part much more than another part, of comparable size. In this context "much more" may mean, for example 50% more, twice more, or any larger or intermediate difference.

The apparatus may further include a processor (e.g., processor 140) configured to: cause application of RF energy to the cavity (e.g., cavity 104) at a plurality of frequencies in a first frequency range, such that the RF energy is applied at low power. For example, low power RF radiation (e.g., 1 W) may be applied from sensing RF source 110 via sensing antenna(s) 112 at a frequency range of 1-5 GHz. At least a portion of the low power RF radiation applied may be reflected back from cavity 104 and received by sensing antennas 112. Detector 116 may detect the received portion of the RF energy and send to processor 140 signals indicative of RF radiation returning from cavity 104 at the plurality of frequencies in the first frequency range.

Processor 140 may further be configured to receive the signals indicative of RF radiation returning from cavity 104 at the plurality of frequencies in the first frequency range and select, based on the received signals, at least two processing instructions for heating the at least two different materials from the plurality of processing instructions stored in the memory. For example, the received signals may be indicative of the temperature of each part of the container and the processor may be configured to select a processing instruction that mainly applies RF energy to a part that has a lower temperature for longer period of time and additional processing instruction that applies RF energy to the part that has higher temperature for a shorter period of time.

Processor 140 may be configured to cause application of the selected processing instructions. Processor 140 may cause processing RF source 120 to apply high power RF energy at a second frequency range via processing antenna (s) 122. In some embodiments, the frequencies at the first range may include frequencies outside ISM bands (e.g., 3-5 GHz), and the frequencies in the second range may include only frequencies within ISM bands (e.g., 902-928 MHz or 2400-2500 MHz). For example, processor 140 may cause processing RF source 120 to apply RF energy at high power of, for example, between 10 W and 10 kW, at frequencies used for processing, for example, between 902 and 928 MHz. Processor 140 may further be programmed to operate the RF processing source based on the feedback received in response to the application of the RF energy at the first frequency range by the RF sensing source. For example, the processor may adjust the high power energy application based on dissipation ratio values (or values of any other parameter indicative of the response of the cavity to application of RF radiation). The dissipation ratio values may be determined based on RF radiation received by sensing antennas 112 to the application of low power RF radiation generated by sensing RF source 110. Scattering parameters detected by detector 116 may be used for calculating the dissipation ratio values, as will be discussed below.

In some embodiments, the apparatus (e.g., apparatus 100) may further include an interface (e.g., interface 144) configured to receive identification of the container to be processed from a user. Processor 140 may be configured to receive from user interface 144 input indicative of the identification of the container. The processor may further be programmed to select a set of processing instructions based on: the feedback in response to the application of the RF energy at the first frequency range (e.g., 1-5 GHz) generated by RF sensing source 110 through sensing antenna 112 and the input received from interface 144. For example, processor 140 may receive from interface 144 input indicative of the identification of object 102. For example, the object may be identified as a 5 ml syringe comprising one part filled with thrombin solution and one part filled with fibrinogen solution. Such a syringe may be useful for forming fibrin sealant. Processor 140 may further receive from detector 116 a feedback in response to the application of the RF energy by sensing antennas 112. The feedback may be associated by processor 140 with the temperature of each part of the syringe, for example, the feedback may indicate that a first part comprising, e.g., the fibrinogen, is completely frozen and that the second part, comprising, e.g., the thrombin, is partially thawed. Processor 140 may select based on the two inputs two sets of processing instructions. The first set of processing instructions may include excitation setups (e.g., frequencies, phases etc.) that heats mainly the frozen part of the syringe, and the second set of processing instructions may include excitation setups that heats mainly the partially thawed part of the syringe. The first set of excitation setups may associate with the excitation setups low power levels and/or short energy application durations. Short energy application durations may be accompanied with long intermissions between energy application events. The second set of heating instructions may associate with the excitation setups contained therein high power and/or long energy application durations. This way, the almost-thawed part may be heated mildly to finish thawing or to be maintained in the almost thawed state, while the still frozen part of the syringe may be heated more rapidly, to reach a situation where both sides are thawed to a similar degree.

In some embodiments, the interface 144 may include a reader (e.g., an RFID reader or a barcode reader) and/or any other mechanism that allows a user to indicate an identification of the object in a machine-readable manner, e.g., a keypad or a touch screen. In some embodiments, a data carrier may be attached to the syringe or to the package of the syringe, and carry data indicative of the identity of the syringe, e.g., the content of the syringe, the size thereof, the temperature it was held at before being placed in the apparatus, etc. In some embodiments, the data may encode an identification of the syringe. The data may be machine readable and/or human readable. The reader may be configured to read the machine readable data. For example, the reader may be a barcode reader and the data carrier may include a barcode. In another example, the reader may include an RFID reader, and the data carrier may include an RFID carrying the data. Additionally or alternatively, the data may be represented in writing, so that a user may enter the data manually, e.g., through a keypad, for example, for occasions that the machine readable data portion of the data carrier is damaged or the reader is not capable of reading the machine readable data for any other reason. In some embodiments, the data carrier may carry data that identifies the object. In some embodiments, the data carrier may carry data that allows access to a memory remote from the apparatus and retrieval of the data indicative of the identification of the object from the memory remote from the apparatus. For example, the data may include an internet address and a code to be entered to the internet site to identify the container associated with the data carrier. The identification of the object may include, for example, content and size of object 102.

In some embodiments, processor 140 is programmed to determine a target temperature range, and to operate RF sensing source 110 and the RF processing source 120 until the feedback received from cavity 104 is indicative of a temperature of at least one part of the object being within the target temperature range. For example, the processor may be programmed to determine that the materials included in the syringe should reach room temperature. The processor may control sensing RF source 110 to apply the RF radiation at frequencies of the first frequency range continuously to receive feedback from the cavity for sensing the condition (e.g., the temperature) of each part of the syringe. The processor may further control processing RF source 120 to apply RF radiation to heat the two parts of the syringe based on the temperatures thereof as sensed as estimated based on the input from the sensing antennas. The processing may be adjusted based on the sensing until the feedback is indicative to the reach of the goal. Such adjustment may include, for example, stopping energy application at excitation setups that heat mainly the warmer part of the sample, or using sets of processing instructions that heat the wormer part less than the cooler part.

The processor may further be programmed to operate sensing RF source 110 and processing RF source 120 until data received from at least one of the temperature sensors is indicative to the reach of the predetermined temperature by at least one of the parts of the container. For example, detector 116 may detect RF energy applied by sensing RF source 110 and calculate the dissipation ratio values to the energy applied at various frequencies. Processor 140 may control the high power RF energy application from processing RF source 120 based on the calculated dissipation ratio values.

In some embodiments, cavity 104 of apparatus 100 may include dielectric material shaped to receive therein the container. In some embodiments, the dielectric material may have a dielectric constant of between 3 and 10. The higher is the dielectric constant of the dielectric material filling the cavity, a greater variety of field patterns may be excited in the cavity, or a smaller cavity may be used for achieving the same variety of field patterns. In some embodiments, the dielectric material may have a loss tangent smaller than 0.01. Such dielectric material may include, for example, polyethylene (high density or low density) molded polycarbonate, polystyrene, and Teflon.

As mentioned above, the apparatus may be configured to receive containers (e.g., syringes) of various sizes and configurations, and heat each by a set of processing instructions designed specifically for this size or configuration. The set of processing instructions may be generated, for example, using simulations, simulating electromagnetic fields (or power loss distributions) excited in the cavity with the container (and, in some embodiments, its package) inside the cavity, at different excitation setups. Then, a combination of excitation setups that are together absorbed to the same extent at the two portions of the syringe may be identified, e.g., by an optimization routine. The combination may be weighted, such that some excitation setups may have larger weights than others, which may correspond to a requirement that more energy is applied at excitation setups of larger weight. Applying more energy at an excitation setup may be accomplished by applying energy at that excitation setup for longer time (longer duration) and/or at higher power level.

The cavity (e.g., cavity 104) may be filled with a dielectric material, having, for example, dielectric constant of between 3 and 10. The higher is the dielectric constant of the dielectric material filling the cavity, a greater variety of field patterns may be excited in the cavity, or a smaller cavity may be used for achieving the same variety of field patterns. In some embodiments, the dielectric constant may be larger than 10 (e.g., 20, 80, 100, etc.). In some embodiments, the loss tangent of the dielectric material, at the frequencies used for heating, may be very small, e.g., smaller than 0.05, smaller than 0.01, or smaller than 0.001. The dielectric material may be solid, liquid, semi-solid, etc. The dielectric material may be held in a package, for example, if the dielectric material is not solid. The package may be flexible, so objects of different sizes and/or shapes may be encased by the packed dielectric material. In some embodiments, the dielectric material may be made of plates that may be taken in and out of the cavity to allow accommodation of smaller and larger objects, respectively.

In some examples, the apparatus may include only processing RF source. In some examples, sensing RF source may also be included, and used, for example, to sense the object in the cavity so as to monitor the progress of the heating, to identify the kind size and/or shape of the container being heated, to verify that the container (e.g., syringe) is at the right position and/or orientation inside the cavity, etc. In some embodiments, the apparatus may also include a position corrector, configured to correct the position of the syringe inside the cavity in case it is sensed to be non-optimal. For example, the syringe may be put on a rotating plate, and sensed by radiating into the cavity at the first frequency range, detecting returning radiation, and analyzing the detected radiation to estimate the orientation of the syringe in the cavity. The estimated orientation may then be compared with a target orientation, and if different, the rotating plate may be rotated to decrease this difference. This rotation of the rotating plate may be, in some embodiments, controlled by processor 140.

In some embodiments, cavity 104 may be rectangular. In some embodiments, it may be cylindrical. The sensing and/or processing antennas may emerge from a base of the cylinder. The syringe may be positioned in parallel to the antennas, for example, when the height of the cylindrical cavity is long enough to accommodate the packed syringe along the height of the cavity or parallel thereto. In some embodiments, the syringe may be positioned perpendicular to the antennas, for example, when the base of the syringe is of large enough a diameter to accommodate the packed syringe across a base of the cylindrical cavity or parallel thereto.

In some embodiments, processing (e.g., heating) may be in a frequency range of between 902 MHz and 928 MHz (the second frequency range), and the cavity may be cylindrical with radius of 110 mm and length of 300 mm, and filled with a dielectric material having a dielectric constant of 3.5. Other exemplary sizes include, for example, radius of 130 mm and height of 80 mm, radius of 110 mm and height of 300 mm, and radius of 127 mm and height of 216 mm. In an alternative embodiment, the radius may be 120 mm, and length may be 150 mm, and the dielectric constant of a dielectric material filling the cavity may be 9.5. The latter may allow exciting, in the given frequency range, and using the same number of antennas (e.g., 4) more field patterns than the former. In some embodiments, the packed syringe may be heated when in the center of the cavity. In some embodiments, the cavity may be designed to receive the object to be heated off-center, for example closer to the antennas. In some embodiments, a position that does not affect the ability to heat uniformly and selectively is not diminished, while mechanical design of the apparatus as a whole may be facilitated, for example, having the syringe positioned with the nozzle closer to the antennas.

Some embodiments may relate to thawing and heating a two-chamber syringe including two materials, one in each chamber (as illustrated in FIG. 6). The heating may be to a predetermined temperature range, for example, a temperature between 30° C. and 35° C. Thawing and heating together may be accomplished in a predetermined time period, for example, 3 minutes, 1 minute, or less. In some embodiments, the thawing is carried out at high power, while heating is carried out at lower power, to omit overheating. The point of change from a full pace processing (associated with thawing) to a slower pace processing (associated with heating a defrosted material) may be set, for example, to a point at which a predetermined amount of energy was absorbed. This may be accomplished by integrating over time a multiplicative product of the dissipation ratio by the incident power. The dissipation ratio may be defined for each antenna as $$DR = (P_{in} - P_{out})/P_{in},$$

Wherein $P_{in}$ is the incident power through the antenna for which DR is calculated; and $P_{out}$ is the sum of powers measured to be received by all the antennas. If the antennas transmit simultaneously and at a common frequency, DR may be defined for the entire system, rather than for each antenna separately. For example, if, during the coherent energy application, there are n radiating elements radiating at overlapping time periods, each radiating element k radiates at amplitude $a_k$ and at a phase $\varphi_k$ (for example, in relation to the phase at which one of the antennas radiate, which has by definition a 0 phase) the DR may be given by equation A below:

$$DR = 1 - \frac{\sum_{i=1}^{n}\left|\sum_{k=1}^{n} S_{ik} a_k e^{j\varphi_k}\right|^2}{\sum_{k=1}^{n} a_k^2} \quad (A)$$

In equation A, $S_{ik}$ is a scattering parameter (also referred to as S parameter), defined as $$S_{ik} = \frac{V_i^-}{V_k^+},$$

where $V_i^-$ is voltage received at radiating element i when voltage $V_k^+$ is supplied to radiating element k. In some embodiments, during coherent radiation, the dissipation ratio may be calculated according to equation B below:

$$DR = 1 - \frac{\sum_{i=1}^{n} a_i^2 |\Gamma_i|^2}{\sum_{i=1}^{n} a_i^2}$$

Wherein $$|\Gamma_i|^2 = \frac{P_{ir}}{P_{if}};$$

$P_{ir}$ is the power received at the "rewind" direction (going from the cavity through the $i^{th}$ antenna to a detector); and $P_{if}$ is the power measured at the "forward" direction (going from the source to the cavity through the $i^{th}$ antenna).

Multiplying DR by the incident power may provide an estimate to the absorbed power, and integrating over time may provide an estimate of the absorbed energy. A predetermined value of absorbed energy may be saved for each kind of sample, and when the absorbed energy estimated based on DR measurements becomes equal to the saved value, the process may go from thawing stage to heating stage.

During heating, the temperature may be monitored based on measurements of values indicative of the electrical response of the cavity to electromagnetic radiation in the frequencies used for heating and/or in another frequency band, e.g., using sensing antennas 112. The values indicative of the electrical response may be, for example, DR values, s parameters, or values derivable from s parameters. In some embodiments, the values indicative of the electrical response of the cavity at each frequency may depend upon temperature in a manner that may be studied in advance. Such a study may be summarized in a table associating values, e.g., of DR, at various frequencies with temperatures. For example, each temperature may be associated with a saved graph of DR vs. frequency, and at every instant the temperature may be estimated based on resemblance between measured graphs of DR vs. frequency and the saved graphs associated with known temperatures. In some embodiments, the temperature of a sample may be estimated as the temperature associated with a saved graph, which is most similar to the graph measured from the sample. Similarity between graphs may be estimated based on well-established mathematical methods, for example, support vector machines (SVM) or other kernel methods.

An example for a container that includes at least two different parts each for holding a different material may be a two-compartment syringe. Reference is made to FIG. 6 that diagrammatically illustrates an exemplary two-compartment syringe having two compartments or part, to be heated according to some embodiments of the invention. A Syringe 600 may include a first part (e.g., compartment) 602 and a second part (e.g., compartment) 604, each for holding a different material. The different materials may be pushed together through needles 608, so that they do not meet. The needles may be arranged so their tips will be sufficiently close, so that the two materials meet once they are out of the needles. An example of such a container is described in detail in US patent application publication No. 2001/0016709.

In some embodiments, heating and/or sensing may be provided to each compartment 602 and 604 of the syringe 600 separately. For example, in some embodiments, some frequencies (or, more generally, some excitation setups) may be known to be absorbed mainly at one of the compartments; for example, in the material held in part 602 and another group of excitation setups may consist of excitation setups known to be absorbed mainly in the other compartment, for example, in the material held part 604. Thus, sensing, heating, or both may be carried out independently (and simultaneously) at each of the compartments. In this manner, in case one of the compartments heats faster than the other, the two may be brought to temperatures within the same temperature range by, for example, heating one of them at higher power levels than the other, or for longer durations. It is noted that if thawing and heating is to be accomplished at challenging short periods, it may be preferred to use the filter protection system described in FIG. 2A over the switch protection system described in FIG. 2B, since the filter arrangement allows sensing during heating, and does not require stopping the heating in favor of sensing. In some embodiments, once it is estimated that one of the compartments has a temperature within a desired range, heating this compartment may stop. In some embodiments, heating the other compartment(s) may continue to bring the other compartment(s) to a temperature within the desired range.

FIGS. 7-10 include flowcharts of methods 700, 800, 900, and 1000 that may be performed by apparatus 100 and/or apparatus 300 and in particular may be executed by processor 140 controlling apparatus 100 and/or apparatus 300. Instructions for executing methods 700-1000 by processor 140 may be stored in memory 142.

Figure 7:
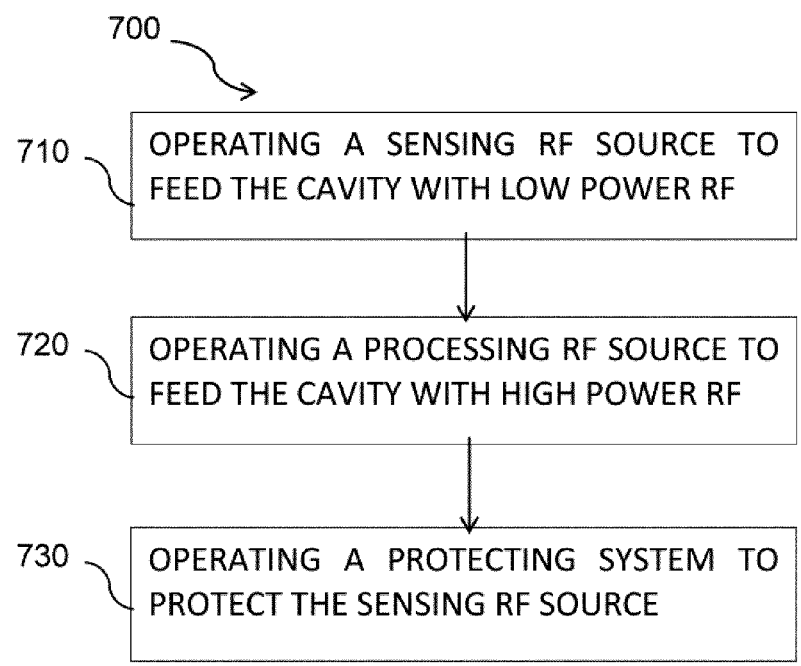
FIG. 7 is a flowchart of a method of processing an object residing in a cavity according to some embodiments of the invention.

Reference is made to FIG. 7 that includes a flowchart of a method of processing an object (e.g., object 102) residing in a cavity (e.g., cavity 104) by heating, drying, and/or thawing the object according to some embodiments of the invention. Method 700 may include, in step 710, operating a sensing RF source (e.g., source 110) to feed the cavity with low power RF radiation of a first frequency range through a sensing antenna (e.g., antenna 112). For example, low RF radiation of less than 1 W may be applied to the cavity at a frequency range of 2-6 GHz. The low RF radiation may be used to sense the state (e.g., a property) of the object, for example, to sense the temperature, position, orientation, etc. of the object.

In some embodiments, the method may further include detecting RF radiation returning from the cavity at the first frequency range. A processor (e.g., processor 140) may receive from a detector (e.g., detector 116) a signal indicative of the response of cavity 104 to the application of the low RF radiation at the first frequency range. For example, the processor may receive values of scattering parameters (or a dissipation ratio) for each of the applied frequencies in the first frequency range. The processor may associate the received signal (e.g., the dissipation ratio values) with a value indicative of a property of the object stored in memory 142. The property may include any property that changes simultaneously with a change in the dielectric constant of the object (or a material included in the object). Changes in the dielectric constant of the object affect the response of the cavity holding the object to the application of the low RF radiation, thus may be detected by an RF detector (e,g., detector 116).

In some embodiments, the method may include, in step 720, operating a processing RF source (e.g., processing RF source 120) to feed the cavity with high power RF radiation of a second frequency range through a processing antenna (e.g., antenna 122). For example, high RF power of 500 KW may be applied to cavity 104 at a frequency range of between 433.05 and 434.79 MHz or between 902 and 928 MHz, or between 2400 and 255 MHz. In some embodiments, the second frequency range may be included in an ISM band. The high power RF radiation may be applied to process (e.g., heat) the object. In some embodiments, the power of the high power RF radiation may be at least 10 times higher than the power of the low power RF radiation. Step 710 and step 720 may be conducted simultaneously, such that the property (e.g., temperature, humidity, etc.) of the object sensed using signals received from detector 116 is monitored during the application of the high power RF energy. In some embodiments, the method may include controlling application of high power RF radiation at frequencies of a second frequency range to the cavity based on the RF radiation detected at frequencies of the first frequency range. The processor may operate the sensing RF source and the processing RF source during overlapping time periods. Processing RF source 120 may be controlled (by the processor) to apply the high power RF radiation until the signal received (by the processor) from the detector is indicative that the temperature of the object reached a desired temperature range.

In some embodiments, the simultaneous operation of processing RF source 120 and sensing RF source 110 may damage sensing RF source 110 due to high power RF radiation received in sensing antennas 122. Therefore, in some embodiments, method 700 may further include, in step 730, operating a protecting system (e.g., system 130) configured to protect the sensing RF source from radiation received from the cavity at the second frequency range. For example, the processor may operate a switch (e.g., switch 134) to prevent concurrent operation of RF sources 110 and 120, so that, when high power RF energy is applied to the cavity, sensing RF source 110 is disconnected from the sensing antenna (112). The processor may control switch 134 to periodically disconnect processing RF source 120 (e.g., every 3 seconds) such that the application of the high power RF radiation is stopped for a short period of time (e.g., 30 milliseconds) during which sensing RF source may apply the low RF energy in order to detect the temperature (or another property) of the object.

In yet another example, operating the protecting system comprises filtering radiation received through the sensing antenna from radiation having frequencies in the second frequency range, such that no frequencies applied at the high power RF radiation are received by the sensing antenna. In some embodiments, operating the protecting system comprises connecting the sensing RF source to the sensing antenna only when the cavity is not fed with high power RF radiation. The processor may be configured to connect the sensing antenna to the sensing RF source (e.g., via a switch) only when the processing RF source does not feed high power RF radiation to the cavity via the processing antenna.

Figure 8:
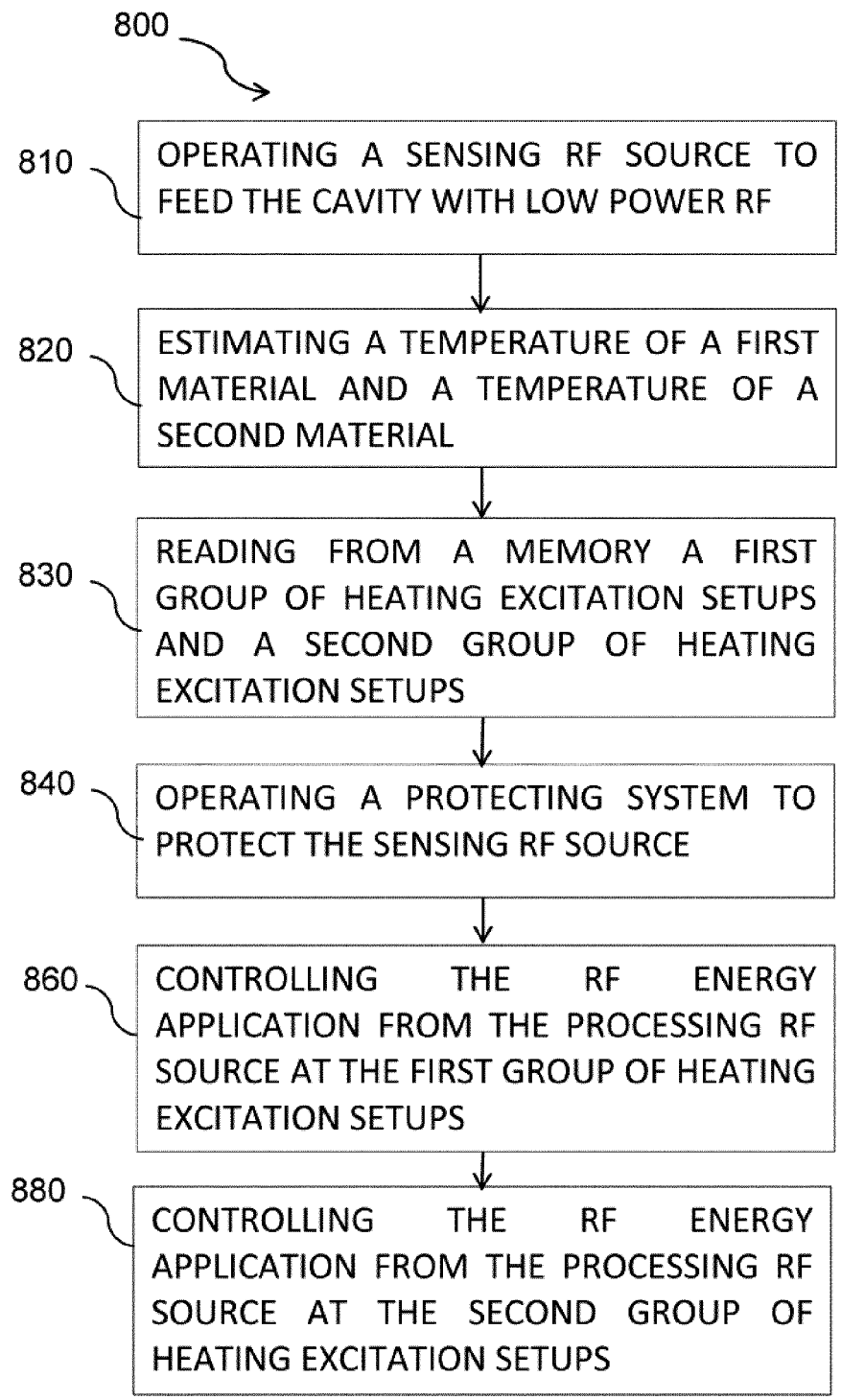
FIG. 8 is a flowchart of a method of heating together two materials, each in its own compartment, to temperatures within a single predetermined temperature range in a single RF cavity according to some embodiments of the invention.

Reference is now made to FIG. 8 that includes a method of heating together two materials, each in its own compartment, to temperatures within a single predetermined temperature range in a single RF cavity according to some embodiments of the invention. Method 800 may include, in step 810, operating a sensing RF source (e.g., RF source 110) to feed the cavity (e.g., Cavity 104) with a plurality of sensing excitation setups. Applying energy at sensing excitation setups may result in excitation of sensing field patterns in cavity 104. The sensing excitation setups may be applied or delivered to the cavity using low power RF radiation. The excitation setups (ES) may differ from one another by one or more values of parameters, controllable by that apparatus, that may affect the field pattern excited in the cavity. For example, a sensing excitation setup may include a frequency, a phase, or a frequency-phase combination at which RF radiation may be applied.

In some embodiments, the method may include, in step 820, estimating a temperature of a first material and a temperature of a second material based on electrical responses of the cavity to the application of RF radiation at the plurality of sensing excitation setups. The sensing excitation setups may excite sensing field patterns in cavity 104. At least some of the RF energy delivered to cavity 104 may be reflected back and received in sensing antenna 112. The frequency and phase of the reflection may depend on the shape of the field pattern excited. The received radiation may be detected by detector 116. Detector 116 may send processor 140 a signal indicative of the electrical responses of the cavity to the application of RF radiation at the plurality of sensing excitation setups. For example, detector 116 may send processor 140, spectrums of scattering parameters vs. frequency; and processor 140 may determine a dissipation ratio spectrum based on the scattering parameters. The processor may associate the dissipation ratio spectrum with a temperature (or a temperature range) stored in a memory associated with the processor. The processor may estimate a temperature of a first material and a temperature of a second material. The processor may compare electrical responses of the cavity (e.g., a dissipation ratio spectrum) to responses (e.g., DR spectrums) stored in the memory in association with temperature. In some embodiments, some portion of the spectrum may be indicative to temperature of the first part of the object, and another portion of the spectrum may be indicative to the temperature of the second part of the object. In some embodiments, the excitation setups used for sensing are known to be responsive mainly to temperature of one of the parts, and the temperature estimated based on the response received at those excitation setups may be associated with the corresponding part of the object. Thus, different excitation setups may be used, in some embodiments, to estimate the temperatures of different parts of the object.

In some embodiments, the method may include step 830 of reading from a memory a first group of processing excitation setups and a second group of processing excitation setups. The first and second groups of processing excitation setups may be applied at high power RF radiation to process and heat the first material and the second material. The first group of processing excitation setups may include excitation setups that when applied to the cavity heats mainly the first material. For example, the first group of processing excitation setups may excite in cavity 104 electromagnetic modes having intensity maximum at or near the compartment of the first material. The second group of processing excitation setups may include excitation setups that when applied to the cavity heats mainly the second material. For example, the second group of processing excitation setups may excite in cavity 104 electromagnetic modes having intensity maximum at or near the compartment of the second material. The first and second groups of processing excitation setups may be determined based on the temperature estimation done in step 820. For example, if the first material was estimated to be frozen, while the second material was already liquid, the processor may select a first group of processing excitation setups having higher maxima near or at the compartment of the first material and heat using them alone. Additionally or alternatively the processor may select to apply more power to the first group of processing excitation setups than to a second group of processing excitation setups that heat mainly the already thawed material. Heating the thawed material may be useful to bringing it to a target temperature (e.g., 37° C.), or to prevent re-freezing of the thawed part of the object due, for example, to heat loss to the immediate environment of the object.

Method 800 may include a step 840 of operating a processing RF source to feed the cavity with the selected groups of processing excitation setups so as to heat the first and second materials as being deemed necessary based on the sensing. The processor may operate the processing RF source to apply high power RF radiation to the cavity at first and second groups of processing excitation setups. The processor may select to apply the RF radiation at the same high power for both the first and the second groups of processing excitation setups. Alternatively, the processor may select to apply different levels of high power RF radiation to the first and second groups of processing excitation setups, e.g., the first group at 200 W and the second group at 500 W. In some embodiments, the processor may select to apply different high power level to different processing excitation setups within the first and/or the second groups of processing excitation setups. The processor may determine the level of the high power based for example, on the electromagnetic response of the cavity to the application of RF radiation in the first and second groups of sensing excitation setups. For example, the processor may apply a power level based on the dissipation ratio calculated from signal received from detector 116.

In some embodiments, processing by applying high power RF energy at processing excitation setups and sensing by applying low power RF energy at sensing excitation setups may be done concurrently. The sensing may be done continuously during the processing of the first and second materials in order to monitor the temperature of the materials and/or the state of the materials and/or the cavity (e.g., to monitor the RF energy dissipation in the materials and/or the cavity).

In some embodiments, method 800 may include a step 850 of adjusting the RF energy application from the processing RF source at the first group of processing excitation setups when it is estimated that the temperature of the first material is within the predetermined temperature range. For example, the processor may stop the application of the RF energy at the first group of processing excitation setups or may reduce the power applied at the first group of processing excitation setups, as to keep the first material warm, while avoiding further heating of the first material.

In some embodiments, method 800 may include, in step 860, adjusting the RF energy application from the processing RF source at the second group of processing excitation setups when it is estimated that the temperature of the second material is within the predetermined temperature range. For example, the processor may stop the application of the RF energy at the second group of processing excitation setups or may reduce the power applied at the second group of processing excitation setups, as to keep the second material warm, while avoiding further heating of the second material.

In some embodiments, the method may further include a third group of processing excitation setups, for example, when it is estimated that the first material reached an intermediate target temperature. The third group of excitation setups may be read from the memory, and used instead of the first group of processing excitation setup. For example, if the intermediate target temperature is indicative that the first material is partially thawed, the processor may select a third group of processing excitation setup that apply lower RF energy than the first group of processing excitation setup, because the first material is not completely frozen.

In some embodiments, the method may further include application of a forth group of processing excitation setups, for example, when it is estimated that the second material reached an intermediate target temperature. The fourth group of processing excitation setups may be read from the memory, and used instead of the second group of processing excitation setup. For example, if the intermediate target temperature is indicative that the second material is partially thawed, the processor may select a forth group of processing excitation setup that apply lower RF energy than the second group of processing excitation setup, because the second material is not completely frozen.

In some embodiments, the method may further include operating a protecting system to protect the sensing RF source from energy received at excitation setups used for heating, for example, protecting system 130, as discussed with respect to step 730 of method 700, therefore, will not be repeated again.

Figure 9:
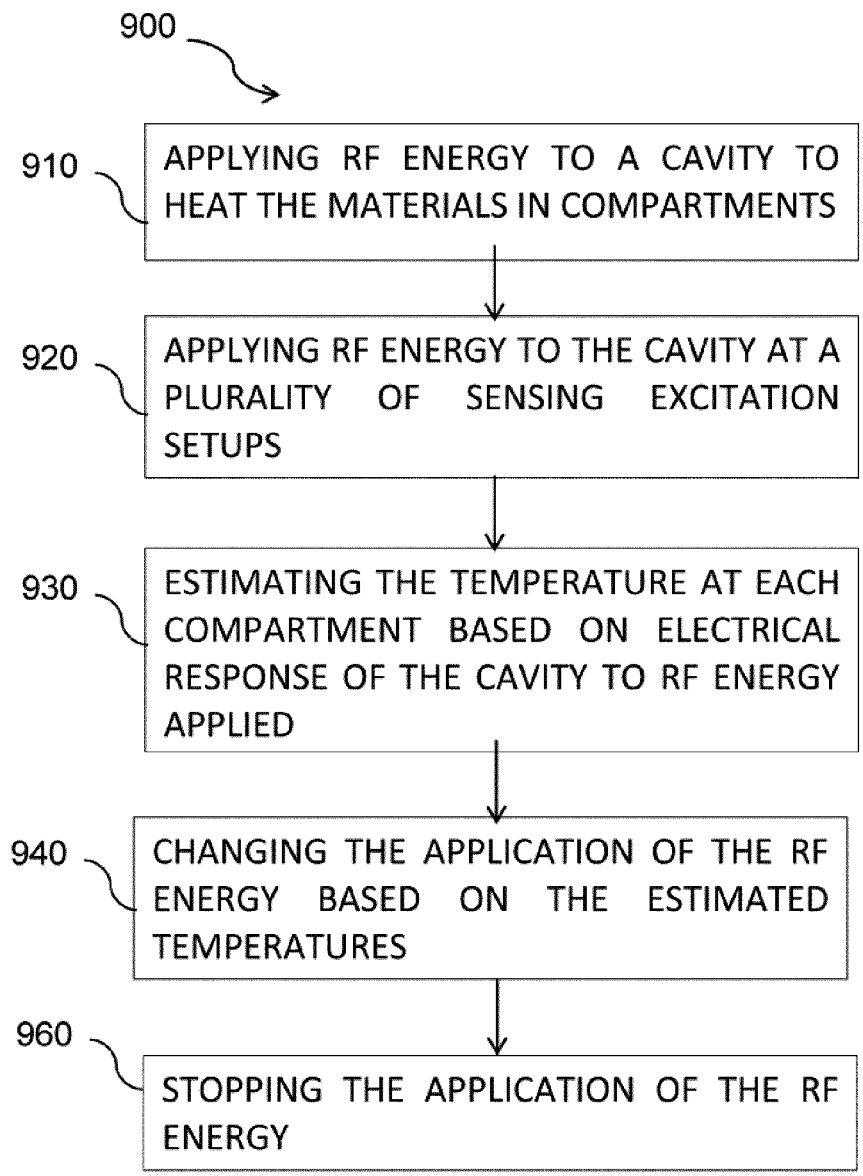
FIG. 9 is a flowchart of heating together a plurality of materials, each in its own compartment, to temperatures within a single predetermined temperature range in a single RF cavity according to some embodiments of the invention.

Reference is now made to FIG. 9 that includes a flowchart of a method of processing together a plurality of materials, each in its own compartment, to temperatures within a single predetermined temperature range in a single RF cavity according to some embodiments of the invention. Method 900 may include, in step 910, applying RF energy to the cavity so as to heat the materials in the compartments. The RF energy may be applied by processing RF source at a plurality of processing excitation setups (e.g., that includes frequencies within the ISM bend) using high power RF energy (e.g., 10 W-1500 W). The processor may cause the application of the RF energy using different processing excitation setups for each of the plurality of materials, as discussed above with respect to method 800.

Method 900 may further include, in step 920, applying RF energy to the cavity at a plurality of sensing excitation setups. The sensing excitation setups may be applied at low RF energy (e.g., below 1 W) in order to sense the state (e.g., the temperature) of at least one of the materials from the plurality of materials. The sensing excitation setups may include frequencies higher than the sensing excitation setups, for example, the lowest frequency used for sensing may be twice as high as the highest frequency used for processing. The temperature at each compartment may be estimated in step 930 based on electrical response of the cavity to RF energy applied at the plurality of sensing excitation setups. The estimation may be done in a similar way to the one disclosed with respect to step 820 of method 800. The estimation may be done by applying a first group of sensing excitation setups that may be absorbed by first material held in the first compartment and by applying a second group of sensing excitation setups that may be absorbed by second material held in the second compartment.

In step 940, the method may include changing the application of the RF energy when it is estimated that one of the compartments is at a temperature within the predetermined temperature range so as not to heat further said one of the compartments (e.g., the first compartment). The RF energy application may be changed as not to apply RF energy at processing excitation setups (e.g., first group of processing excitation setups) that may dissipate mainly at the first material held in the first compartment. These processing excitation setups may excite in the cavity EM modes having an intensity maxima at or in proximity to the first compartment. Alternatively, the processor may cause the application of RF energy at the first group of processing excitation setups, using lower power levels or for shorter durations, so as not to further heat the first material, while keeping the temperature of the first material within the predetermined temperature range.

In step 950, the method may further include stopping the application of the RF energy when it is estimated that all of the compartments are at temperatures within the predetermined temperature range. The processor may stop all the RF energy application at the processing excitation setups to stop the heating process of the plurality of materials. In some embodiments, the RF energy application at the sensing excitation setups may continue in order to monitor the temperature of the plurality of materials still in the cavity.

Figure 10:
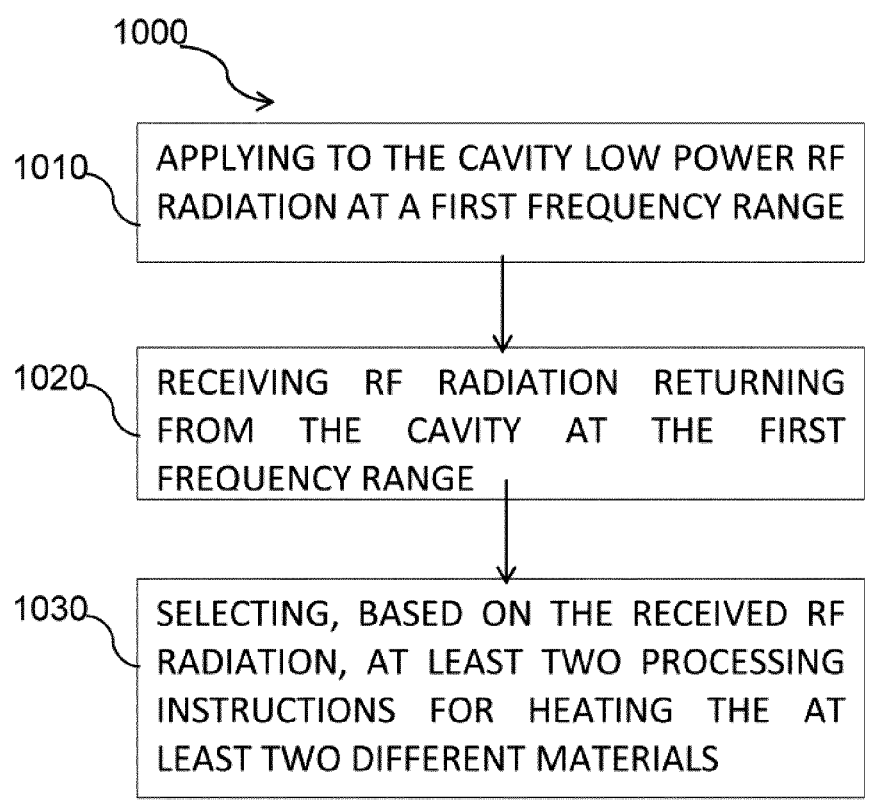
FIG. 10 is a flowchart of a method of heating at least two different materials held in at least two different parts of a container placed in a cavity according to some embodiments of the invention.

Reference is made to FIG. 10 that includes a flowchart of a method of heating using RF according to some embodiments of the invention. The heating may be applied to two (or more) different materials, each held in a different part, e.g., different compartment, of a container placed in a cavity. Method 1000 may include, in step 1010, applying to the cavity low power RF radiation (e.g., using sensing RF source 110 and sensing antenna 112) at a first frequency range. In some embodiments, the low power RF radiation may be applied at power level of at most 1 W. In some embodiments, the low power RF radiation may be applied at sensing excitation setups. The sensing excitation setups may include frequencies in the first frequency range, for example, between 3 and 8 GHz.

Method 1000 may include, in step 1020, receiving RF radiation returning from the cavity at the first frequency range in response to the application to the cavity of RF energy at the sensing excitation setups. The received RF radiation may be received at sensing antenna 112 and detected by detector 116. Detector 116 may send to processor 140 signals indicative of the response of cavity 104 to the application of the low power RF radiation. For example, the signal may be indicative of values of scattering parameters measured by detector 116, and the frequencies at which these values were measured. Processor 140 may process the received signal to estimate a state or property of the object (e.g., temperature, position, etc.) based on a comparison between the received signal to signals stored in a memory (e.g., memory 142) in association with properties of the objects from which the stored signals were measured. The processor may process the information carried by the signal, and compare the processed information to obtain a spectrum (e.g., the dissipation ratio value vs. frequency) and compare the obtained spectrum to a stored spectrum. In some embodiments, the signal received from the detector may be indicative of the spectrum, so that the processing of the received signal to obtain the spectrum may be omitted. The processor may compare the spectrum with spectrums saved in association with properties of the object (e.g., temperature at each part), and estimate the properties of the object based on the comparison. For example, it may be estimated that the properties of the object are like those associated in the memory with a spectrum that resembles the most to the spectrum obtained based on signals from the detector.

Based on the comparison the processor may estimate the state of each of the two different materials. Method 1000 may further include, in step 1030, selecting based on the received RF radiation, at least two sets of processing instructions for heating the at least two different materials. In some embodiments, the at least two sets of processing instructions may be selected from a plurality of sets of processing instructions, comprising a first set of processing instructions that if executed mainly heats a first part of the container and a second set of processing instructions that if executed mainly heats a second part of the container. The heating instructions may include applying high power RF energy (e.g., using processing RF source 120 and processing antenna 122) at a second frequency range, for example, at a frequency range of between 433.05 and 434.79 MHz or between 902 and 928 MHz. In some embodiments, the RF energy applied in high power may be at least 10 times higher than the RF energy applied at low power. The second frequency range may be included in an ISM bend. In some embodiments, the first frequency range and the second frequency range each includes different frequencies. In some embodiments, the lowest frequency in the first frequency range is higher than the highest frequency in the second frequency range, e.g., by 500 MHz or more.

In some embodiments, the processing instructions may include applying high power RF energy at processing excitation setups. The processing excitation setups may include frequencies at the second frequency range. In some embodiments, each set of processing instructions may include: a plurality of excitation setups, each associated with a duration, timing, and/or power level. In some embodiments, In some embodiments, method 1000 may further include determining a target temperature and automatically repeating steps 1010, 1020 and 1030, until a temperature of at least one part of the container reaches the target temperature. For example, a two compartment syringe comprising a cold medication that was held at 4° C. may be warmed to 35-37° C. before being injected into a patient. Processor 140 may execute the sensing and processing steps of method 1000, until at least one part of the syringe reaches 35-37° C. In some embodiments, steps 1010, 1020 and 1030 may be repeated until each part of the container reaches the target temperature determined.

In the foregoing Description of Exemplary Embodiments, various features are grouped together in a single embodiment for purposes of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate embodiment of the invention.

Moreover, it will be apparent to those skilled in the art from consideration of the specification and practice of the present disclosure that various modifications and variations can be made to the disclosed systems and methods without departing from the scope of the invention, as claimed. For example, one or more steps of a method and/or one or more components of an apparatus or a device may be omitted, changed, or substituted without departing from the scope of the invention. Thus, it is intended that the specification and examples be considered as exemplary only, with a true scope of the present disclosure being indicated by the following claims and their equivalents.

The invention claimed is:

1. A method of heating at least two different materials held in at least two different parts of a container placed in a cavity, comprising:
    (a) applying to the cavity low power RF radiation at a first frequency range;
    (b) receiving RF radiation returning from the cavity at the first frequency range; and
    (c) selecting, based on the received RF radiation, at least two sets of processing instructions for heating the at least two different materials,
        wherein the at least two sets of processing instructions are selected from a plurality of sets of processing instructions, comprising a first set of processing instructions that when executed mainly heats a first part of the container and a second set of processing instructions that when executed mainly heats a second part of the container.

2. The method of claim 1, wherein the plurality of sets of processing instructions comprises at least one processing instructions that when executed heats the first and second parts substantially to a same degree.

3. The method of claim 1, wherein each of the two sets of processing instructions comprises:
    applying high power RF energy at a frequency within a second frequency range, different from the first frequency range.

4. The method of claim 3, wherein a lowest frequency of the first frequency range is higher than a highest frequency of the second frequency range.

5. The method of claim 2, wherein each of the two sets of processing instruction comprises: at least one excitation setup associated with a duration, a power level, or a duration and a power level for applying each of the at least one excitation setup.

6. The method of claim 3, wherein a lowest frequency in the first frequency range is higher than a highest frequency in the second frequency range by at least 500 MHz.

7. The method of claim 3, wherein the processing instructions comprise:
    applying each frequency through a plurality of antennas during overlapping time periods.

8. The method of claim 2, wherein the RF energy applied in high power is at least 10 times higher than the RF energy applied at low power.

9. The method of claim 2, comprising determining a target temperature and automatically repeating steps (a), (b) and (c), until a temperature of the first or second part of the container reaches a target temperature.

10. The method of claim 2, comprising:
    determining a target temperature for each of the first and second parts of the container; and
    automatically repeating steps (a), (b) and (c) until each first and second part of the container reaches the target temperature determined.

11. An apparatus for heating at least two different materials held in at least two different parts of a container placed in a cavity, comprising:
    a memory storing a plurality of processing instructions comprising:
        a first processing instruction, associated with a first part of the container, that when executed mainly heats the first part of the container, and
        a second processing instruction, associated with a second part of the container, that when executed mainly heats the second part of the container; and
    a processor configured to:
        cause application of RF energy to the cavity at frequencies of a first frequency range, wherein the RF energy is applied at low power;
        receive signals indicative of RF radiation returning from the cavity at the frequencies of the first frequency range;
        select, based on the received signals, one or more processing instruction from the plurality of processing instructions stored in the memory for heating at least one of the at least two different materials; and
        cause application of the selected one or more processing instructions.

12. An apparatus according to claim 11, further comprising a sensing RF source and a sensing antenna to apply RF energy at low power and at the first frequency range, and receive a feedback in response to the application of the RF energy at the frequencies of the first frequency range.

13. The apparatus of claim 11, further comprising a processing RF source and a processing antenna to apply to the cavity RF energy at high power and at frequencies of a second frequency range.

14. The apparatus of claim 13, wherein the RF energy applied in high power is applied at power level at least 10 times higher than a power level at which RF energy is applied at low power.

15. The apparatus of claim 11, wherein the processor is programmed to operate an RF processing source based on the signals received in response to the application of the RF energy at the first frequency range by an RF sensing source.

16. The apparatus of claim 11, comprising an interface configured to receive input indicative of an identification of the container, and the processor is configured to receive from the interface data indicative of the input, and programmed to select the processing instructions based on;
    the signals received in response to the application of the RF energy at the frequencies of the first frequency range by an RF sensing source; and
    the input received from the interface.

17. The apparatus of claim 16, wherein the interface includes a reader for a machine readable data carrier.

18. The apparatus of claim 17, wherein the machine readable data carrier carries machine readable data encoding identity data.

19. The apparatus of claim 18, wherein the machine readable data carrier carries data allowing access to a memory remote from the apparatus and retrieving data indicative of the identity data from the memory remote from the apparatus.

20. The apparatus of claim 12, wherein the processor is programmed to determine a target temperature range, and to operate the RF sensing source and the RF processing source until the feedback received is indicative of a temperature being within the target temperature range.

21. The apparatus of claim 13, wherein the frequencies at the first range include frequencies outside ISM bands, and the frequencies in the second frequency range include only frequencies within ISM bands.

22. The apparatus of claim 11, wherein the cavity comprises dielectric material shaped to receive therein the container.

23. The apparatus of claim 22, wherein the dielectric material has a dielectric constant of between 3 and 10.

24. The apparatus of claim 23, wherein the dielectric material has a loss tangent smaller than 0.01.

* * * * *